June 29, 1943.  W. F. PECK ET AL  2,322,878
EYE TESTING INSTRUMENT
Original Filed April 6, 1939   12 Sheets-Sheet 4
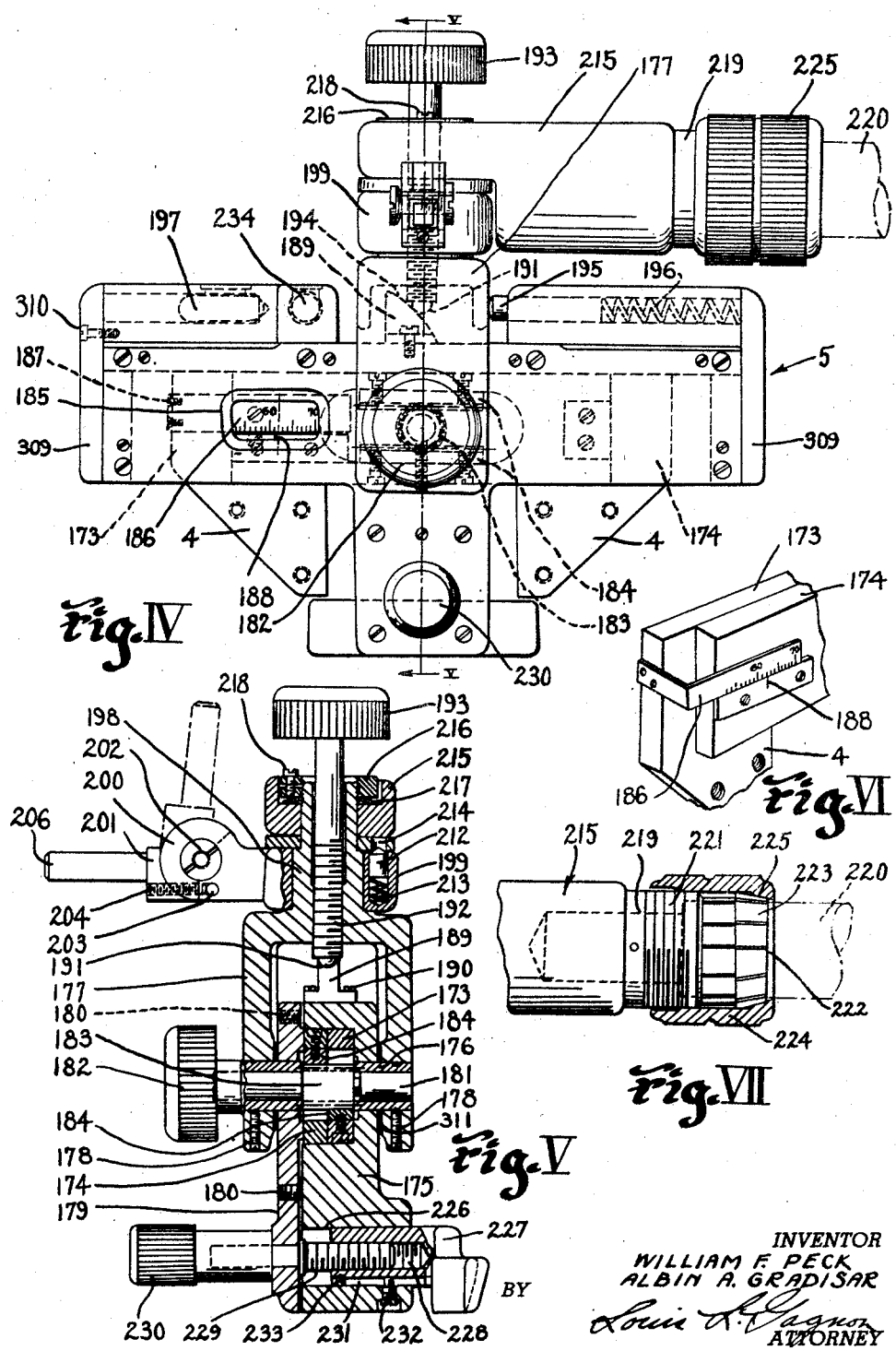
INVENTOR
WILLIAM F. PECK
ALBIN A. GRADISAR
BY Louis L. Gagnon
ATTORNEY

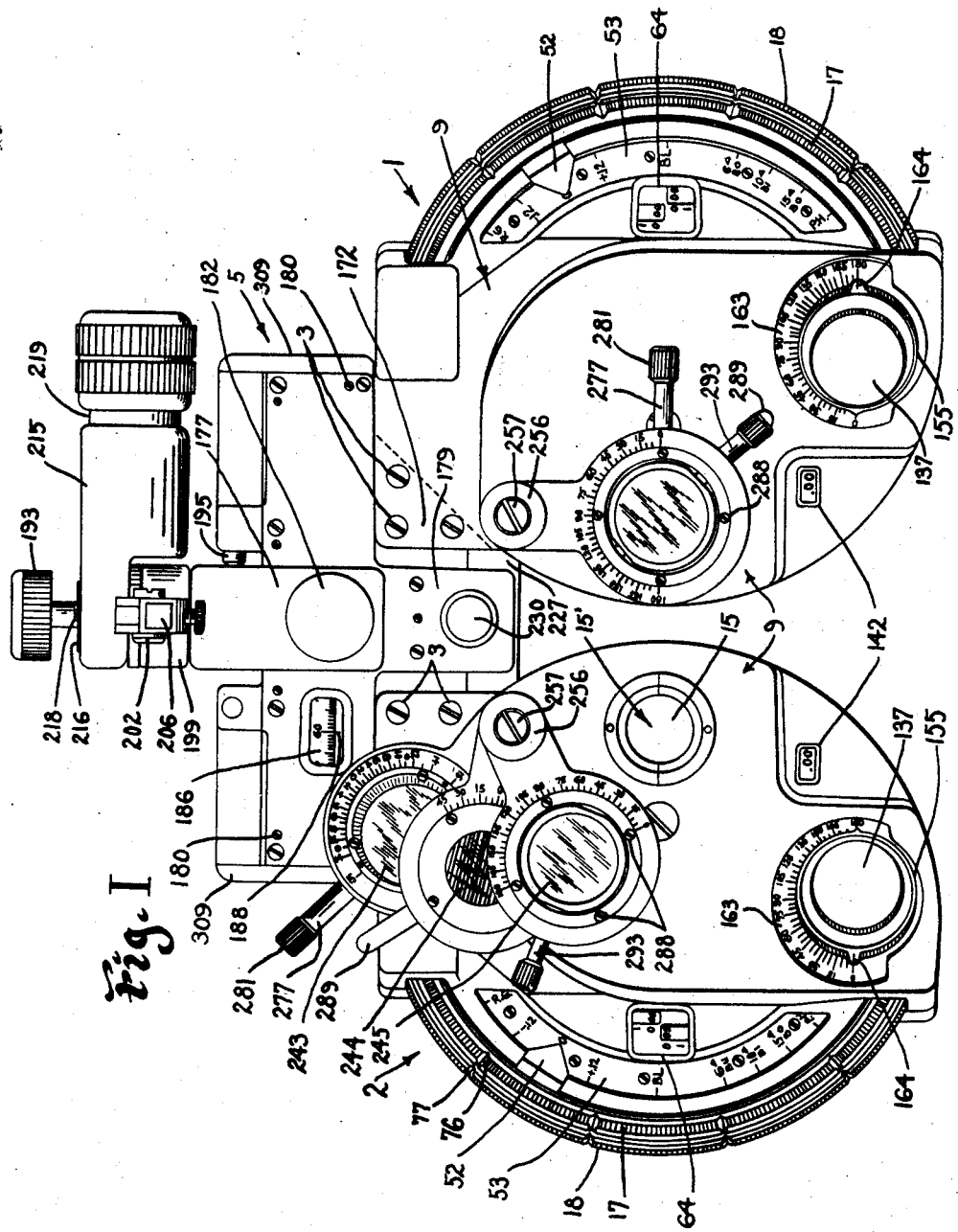

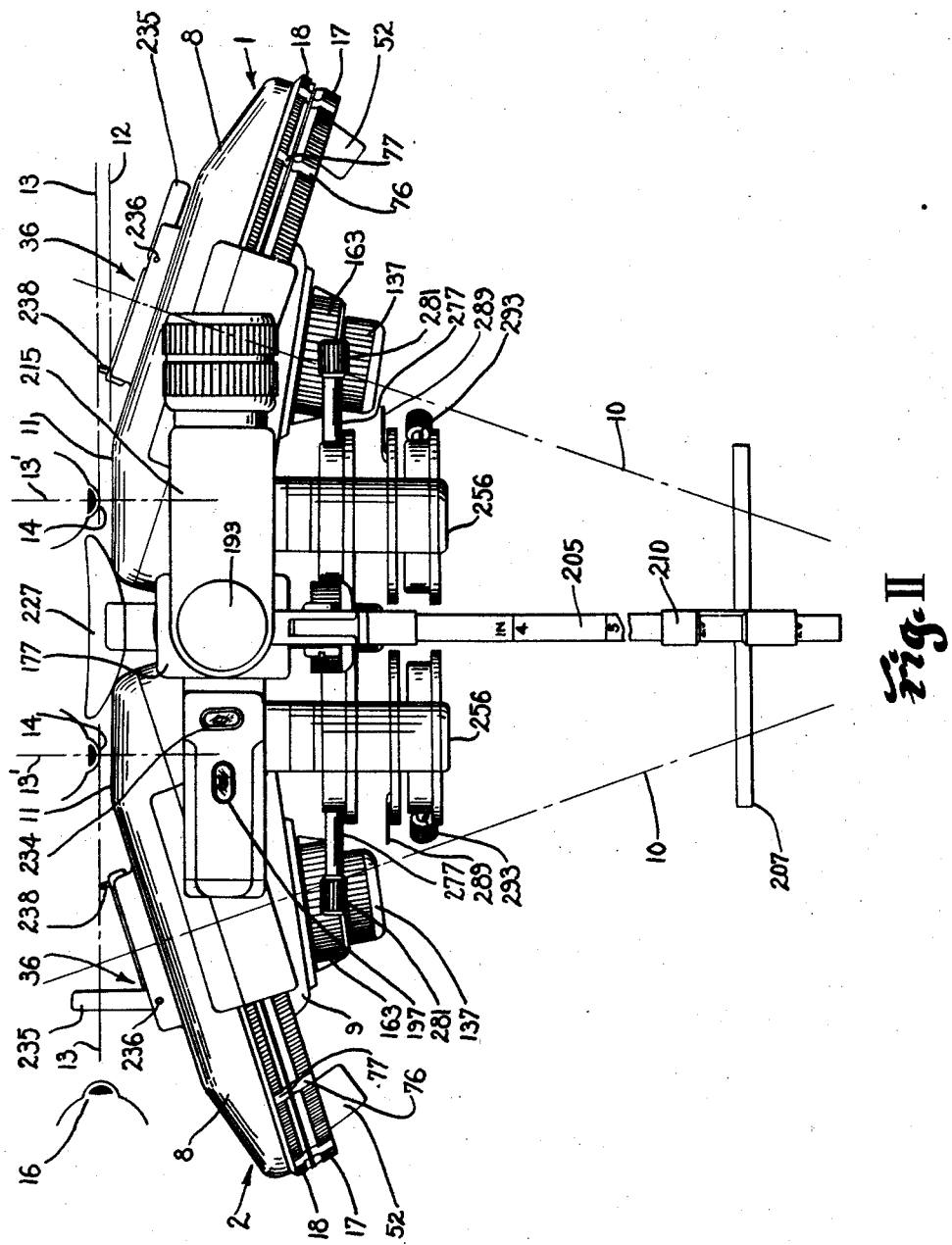

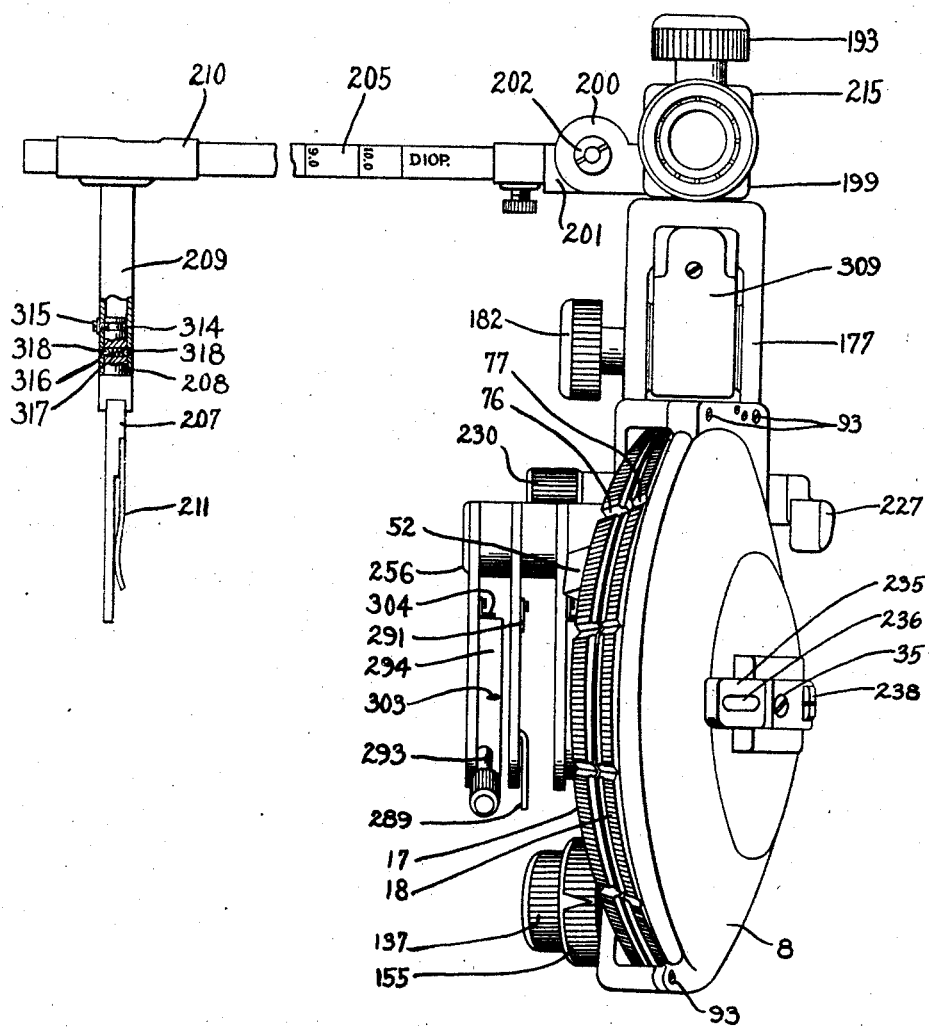

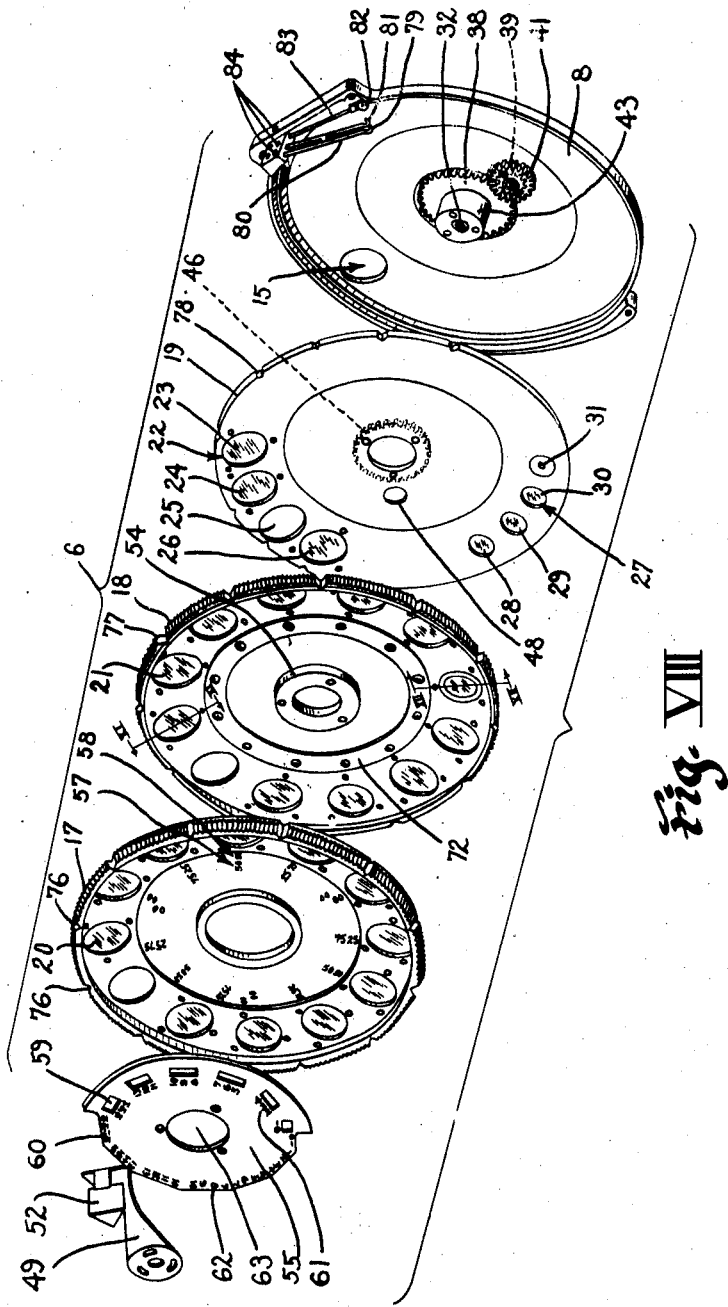

June 29, 1943.  W. F. PECK ET AL  2,322,878
EYE TESTING INSTRUMENT
Original Filed April 6, 1939   12 Sheets-Sheet 6
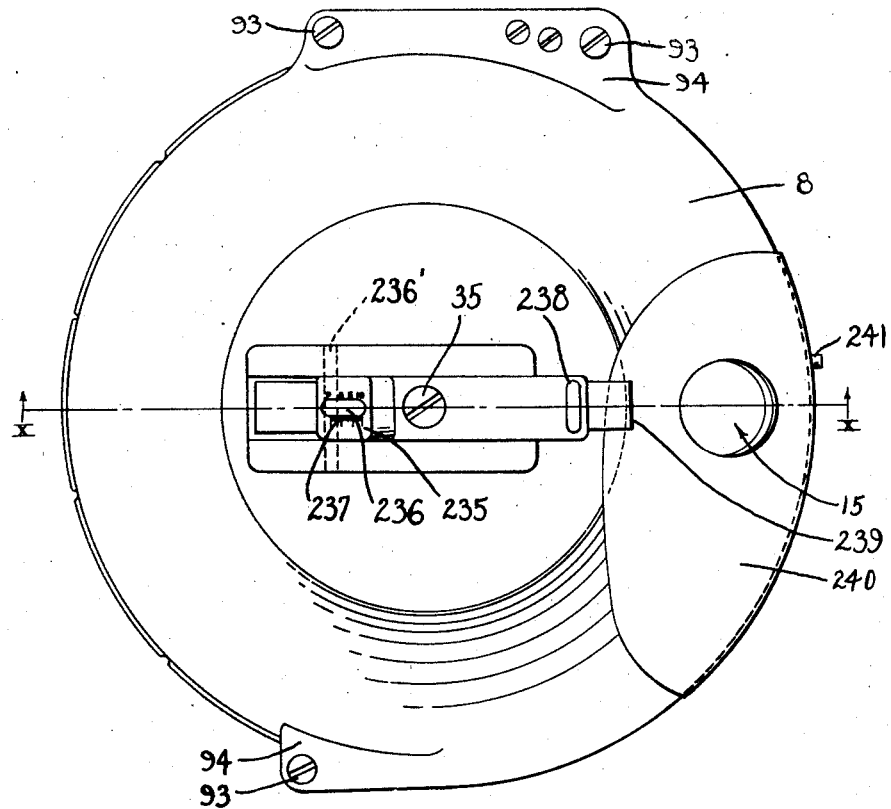
Fig. IX
INVENTOR
WILLIAM F. PECK
ALBIN A. GRADISAR
BY
ATTORNEY

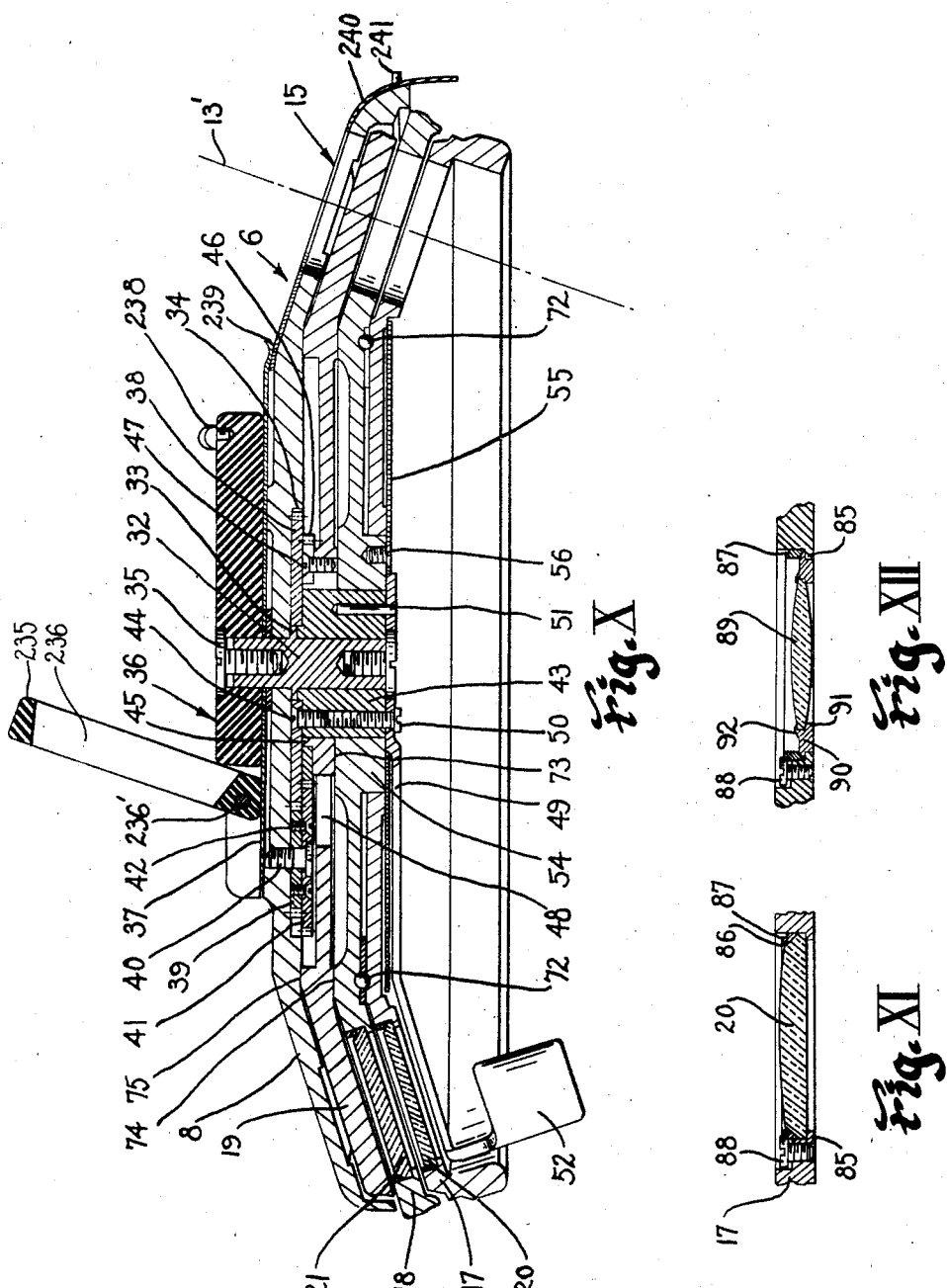

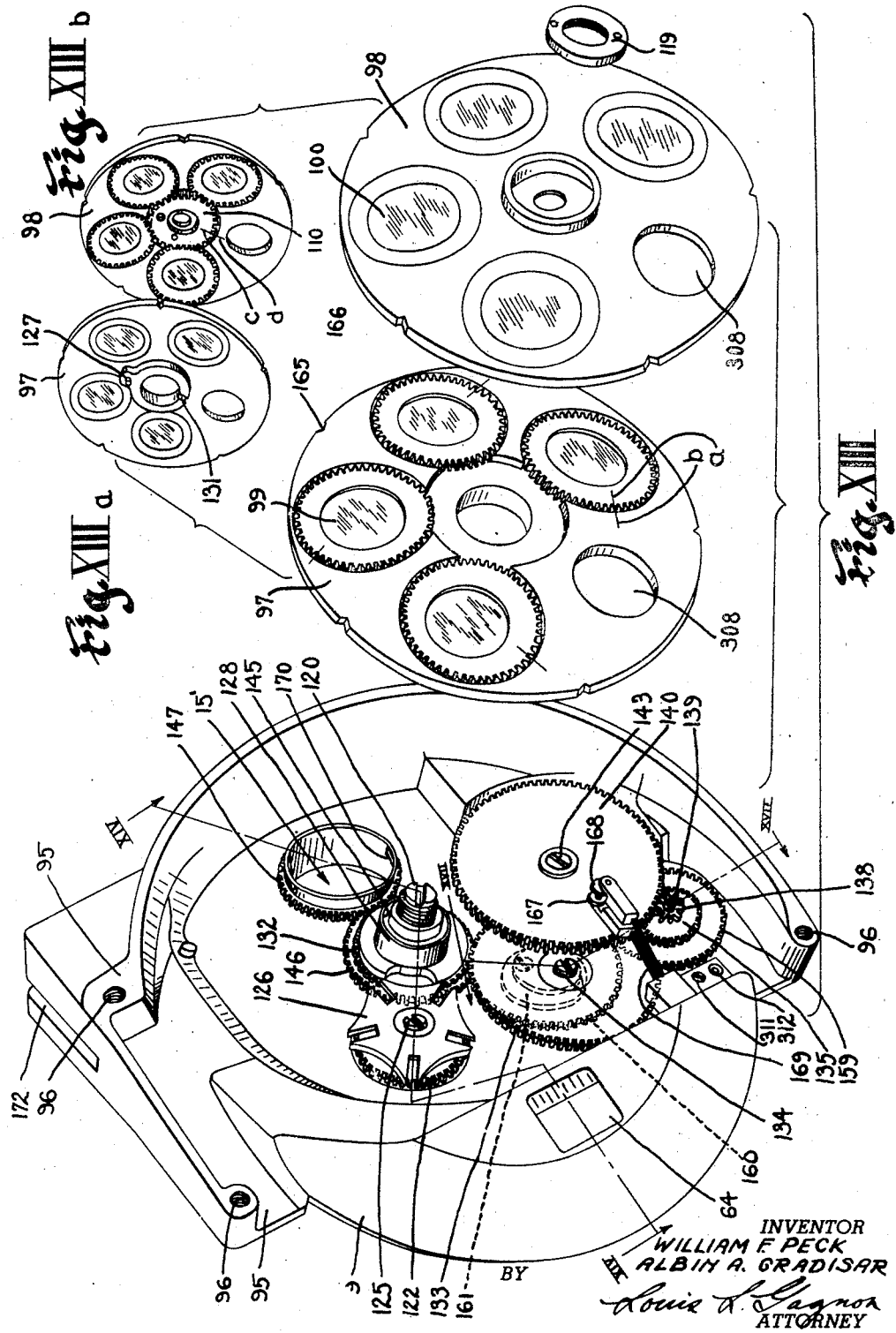

June 29, 1943.  W. F. PECK ET AL  2,322,878
EYE TESTING INSTRUMENT
Original Filed April 6, 1939   12 Sheets-Sheet 9
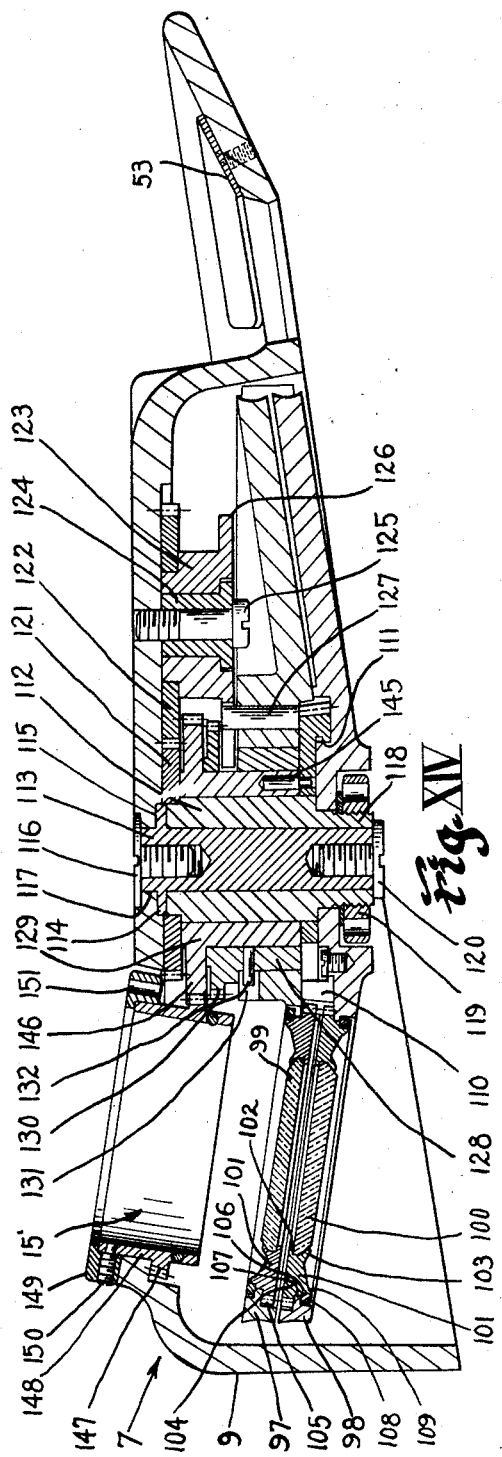
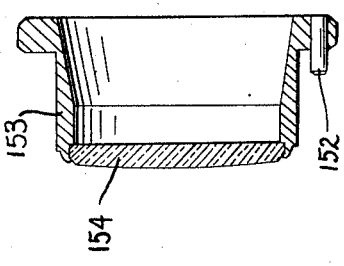
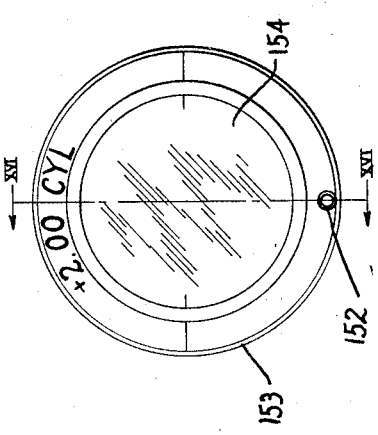
INVENTOR
WILLIAM F. PECK
ALBIN A. GRADISAR
BY
ATTORNEY

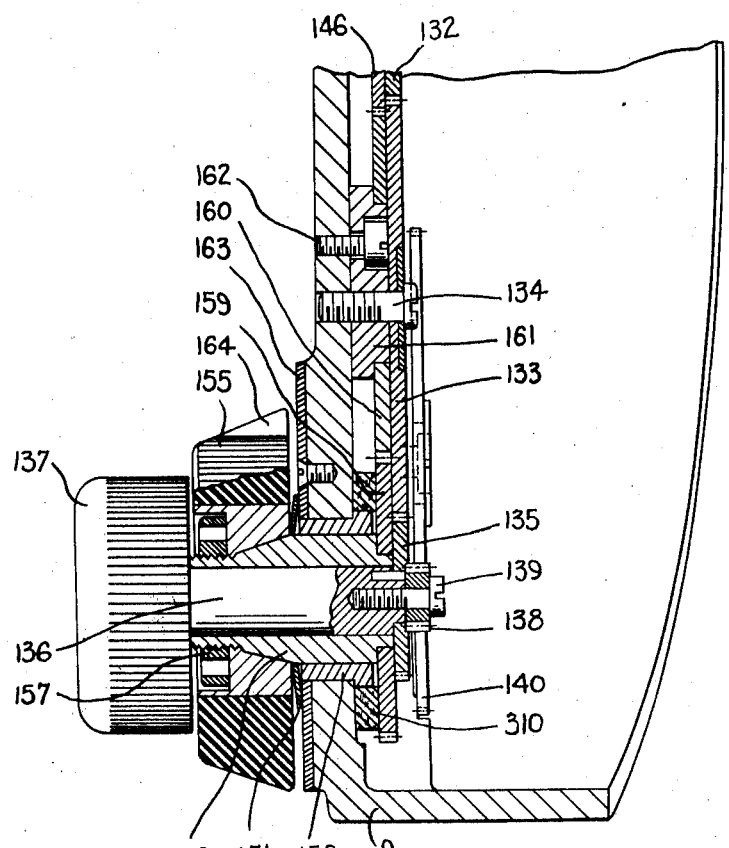
Fig. XVII
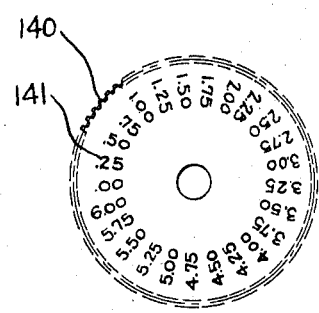
Fig. XVIII

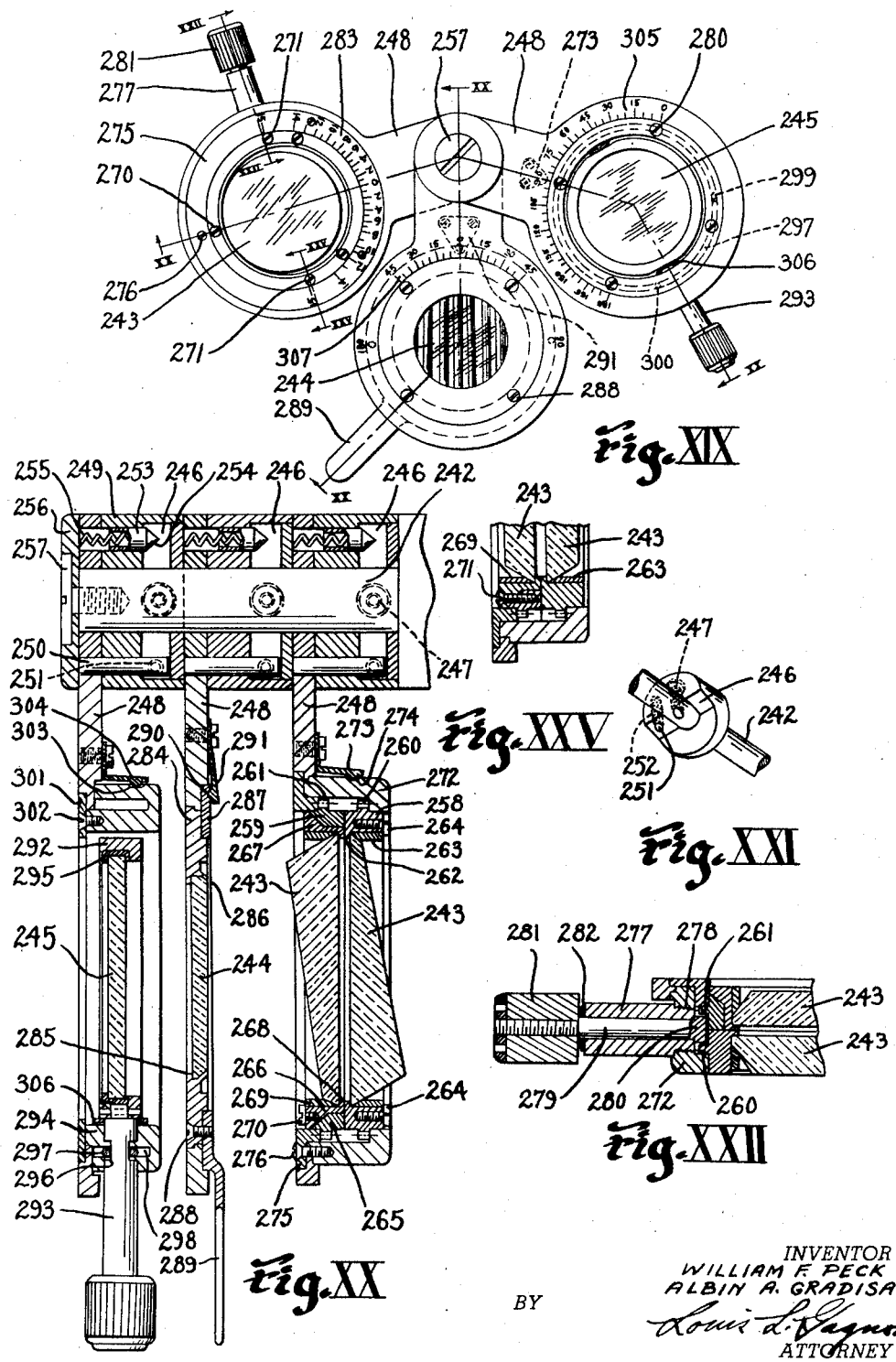

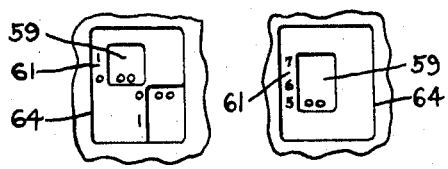
Fig. XXIIIa  Fig. XXIIIg
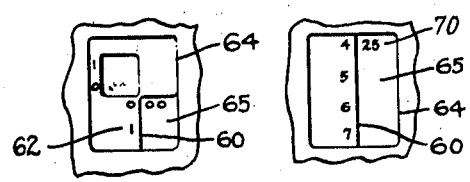
Fig. XXIVa  Fig. XXIVg
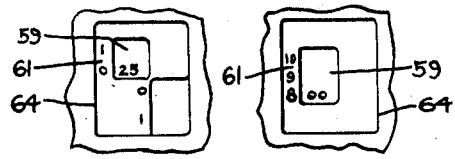
Fig. XXIIIb  Fig. XXIIIh
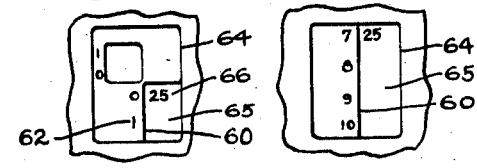
Fig. XXIVb  Fig. XXIVh
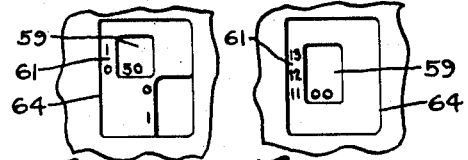
Fig. XXIIIc  Fig. XXIIIk
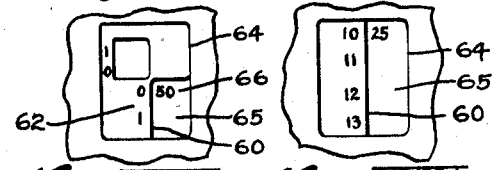
Fig. XXIVc  Fig. XXIVk
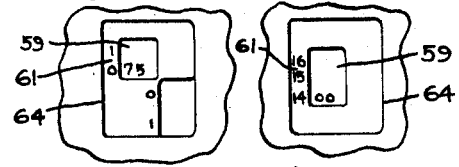
Fig. XXIIId  Fig. XXIIIm
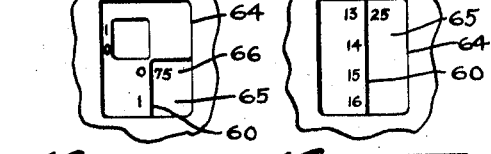
Fig. XXIVd  Fig. XXIVm
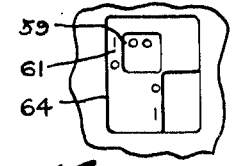
Fig. XXIIIe
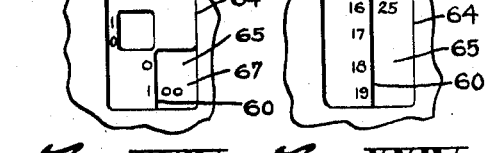
Fig. XXIVe  Fig. XXIVn
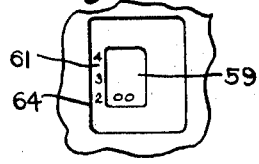
Fig. XXIIIf
Fig. XXIVf
INVENTOR
WILLIAM F. PECK
ALBIN A. GRADISAR
BY
ATTORNEY Patented June 29, 1943

2,322,878

UNITED STATES PATENT OFFICE 2,322,878

EYE TESTING INSTRUMENT

William F. Peck, Snyder, and Albin A. Gradisar, Buffalo, N. Y., assignors to American Optical Company, Southbridge, Mass., a voluntary association of Massachusetts Original application April 6, 1939, Serial No. 266,360. Divided and this application September 18, 1941, Serial No. 411,422

12 Claims. (Cl. 88—22)

This invention relates to improvements in ophthalmological instruments and has particular reference to an improved form of instrument for use in determination of the lens values necessary to properly correct defective or imperfect vision of various individuals.

This application is a division of our co-pending application Serial No. 266,360, filed April 6, 1939, now Patent 2,266,797, December 23, 1941.

One of the principal objects of the invention is to provide an instrument of the above character whereby a minimum amount of the face of the individual being tested will be covered by said instrument, with the major portion of the operating mechanism of the instrument disposed in a direction away from the face so as to avoid the patient's having a confined or couped up feeling, which might cause fatigue and nervous tension, having undesirable reactionary effects on the tests performed by said instrument and which will permit ease of manipulation of said adjustable parts without having the operator's hands engage the face.

Another important object of the invention is to provide an instrument of the above character whereby the lens cells may be placed in closer proximity with the eyes of the individual under test than has been usual with most prior art instruments of this nature in the past, without the instrument having undesirable contact with the nose or adjacent portion of the face of the individual during said test.

Another important object of the invention is to provide a cooperatively functioning series of lenses computed as to curvatures and thicknesses, distance between the lenses of said series and position of said lenses before the eyes of the patient and associated mechanism for automatically adding the individual lens powers before the eyes, both spherical and cylindrical, whereby a reading of the total lens power combine is given, thus making unnecessary any calculations by the examiner or practitioner.

Another important object is to provide an instrument of the above character with adjustable portions which are exceptionally free and easy to manipulate without undesirable annoying contact with the individual under test and with the associated adjustable elements so correlated with each other and with the face of the patient or individual under test as to eliminate fogging of the lenses supported by said mechanism due to condensation of the patient's breath, etc., and to exclude to a major extent the accumulation of dirt, dust, etc., on the lenses during the use of the instrument.

Another important object is to provide an instrument of the above character with associated units which may be quickly and easily disassembled for possible repairs or cleansing, and so that units having different characteristics may be interchanged with each other.

Another important object is to provide an instrument of the above character which is so constructed as to provide a relatively wide field of vision when looking through the test cells of said instrument and to eliminate to a great extent tubular type vision when looking through said units.

Another object is to provide an instrument of the above character which may be quickly and easily adjusted and retained in desired position before the eyes of the individual under test, and with the various means which are to be manipulated during said tests so disposed that they may be easily manipulated without interfering with the field of vision of the individual during said tests and without the individual's direct knowledge of said manipulations.

Another object is to provide an instrument of the above character with relatively simple and efficient corneal aligning means whereby the instrument may be accurately located in position before the eyes of the individual under test.

Another object is to provide improved details of construction and method of assembly of the various parts of the instrument, whereby the said parts may be quickly and easily assembled or disassembled and will be relatively free and easy to manipulate during the use of the instrument.

Another object is to provide an instrument of the above character having the major portion of its lens cells angled with respect to the line of direct vision through the observation means of said instrument so that the major portion of the instrument will be disposed in a direction away from the face of the indiivdual under test.

Another object is to arrange the operating mechanism of the various adjustable parts correlated with the lens systems of said instruments before the eyes of the individual under test, whereby the desired lens combinations may be quickly and easily disposed in alignment with the observation openings of said units, and the ratio of movement of said lens cells may be positively controlled, particularly in the cylindrical component of the instrument, whereby the cylinder axes of the lenses of the different series of said cylindrical components will remain coincident with each other when the units are in alignment with the observation opening of the instrument and are rotatably adjusted.

Another object is to provide novel means and method of assembling the lens elements with their retaining means during the manufacture of the instrument.

Another object is to provide an instrument of the above character with all of its operable parts disposed toward the front of the instrument.

Another object is to provide novel means for adjustably supporting the separate units of the instrument whereby the distance between said units may be quickly and easily changed with positive control of adjustment and the angle of disposition of the instrument with respect to the line of straight ahead vision through the instrument may be altered to the requirements of the individual under test.

Another object is to provide novel means of attaching the instrument with separate supporting means.

Another object is to provide a novel arrangement for supporting a near test card whereby the said card may be moved in a horizontal and vertical direction and in a direction toward and away from the instrument.

Another object is to provide an instrument of the above character with a durable and positive functioning construction with most of the adjustable parts confined within a housing, so as to provide a neat, compact appearance.

Another object is to provide the supporting discs or lenses of the instrument with relatively large surface bearings whereby the desired distance between the lenses of respective discs may be maintained during the use of the instrument.

Another object is to provide simple and efficient means of attachment of auxiliary units.

Another object is to provide novel arrangement of cylinder cell control whereby the means for rotating the desired cylinder lens in alignment with the observation opening of the instrument and the axis control means are concentrated at a single point of adjustment.

Another object is to provide novel means and method whereby the lens cells may be quickly and easily adjusted to zero position.

Another object is to provide an independently adjustable cell carrying a plurality of lenses separately of the main cells of the instrument which may be adjusted through a compound operating mechanism whereby a slight movement of the adjustment control means will impart a relatively great movement to the immediate cell.

Another object is to provide scale and indicator means associated with the separately adjustable portions of the instrument which may all be viewed from the front or examiner's side of the instrument.

Another object is to provide novel means and method of automatically locating the various adjustable components in desired positional relation with respect to the observation openings of the instrument.

Another object is to provide novel headrests for instruments of the above character.

Another object is to provide a system for indicating the total power values of the lenses in alignment with the observation openings of the instrument, whereby the indicia indicating said power values will be located adjacent the plane of the window openings in the respective units of the instrument and will be readily visible.

Other objects and advantages of the invention shall become apparent from the following description taken in conjunction with the accompanying drawings and it will be apparent that many changes may be made in the details of construction, arrangement of parts, and methods shown and described without departing from the spirit of the invention as expressed in the accompanying claims. We, therefore, do not wish to be limited to the exact details of construction, arrangement of parts, and methods shown and described, as the preferred forms only have been given by way of illustration.

Referring to the drawings:

Fig. I is a front elevation of the instrument embodying the invention;

Fig. II is a top plan view of the instrument illustrated in Fig. I;

Fig. III is a side elevation of said instrument;

Fig. IV is an enlarged fragmentary front elevation of the supporting mechanism for the separate units, showing the means for changing the distance between said units and for altering the angular disposition of the cells with respect to a line passing through the centers of the eyes;

Fig. V is a sectional view taken as on line V—V of Fig. IV;

Fig. VI is a fragmentary perspective view of the scale indicating the amount of adjustment for changing the distance between the units;

Fig. VII is a fragmentary partial sectional view showing the means for attaching the instrument to an instrument support;

Fig. VIII is a perspective view of the spherical lens system and associated parts in disunited relation with each other;

Fig. IX is a rear elevation of one of the units of the instrument;

Fig. X is an enlarged sectional view of one of the units taken as along line X—X, such as illustrated in Fig. IX;

Fig. XI is an enlarged fragmentary sectional view taken as on line XI—XI of Fig. VIII and illustrating how the lenses are secured in their supporting disc;

Fig. XII is an enlarged fragmentary sectional view taken as on line XII—XII of Fig. VIII, illustrating how a relatively small diameter lens is secured to the lens supporting disc;

Fig. XIII is a perspective view of the cylindrical component of a unit and its associated operating mechanisms, showing the parts in disunited relation with each other;

Fig. XIIIa is a perspective view of the face of the disc to which it is linked on the side thereof opposite the side illustrated in Fig. XIII;

Fig. XIIIb is a view similar to Fig. XIIIa of the other side of Fig. XIII with which it is linked;

Fig. XIV is a slightly enlarged sectional view taken as on line XIV—XIV of Fig. XIII, showing the various parts of the unit in assembled relation with each other;

Fig. XV is a face view of an auxiliary unit;

Fig. XVI is a sectional view taken as on line XVI—XVI of Fig. XV;

Fig. XVII is an enlarged fragmentary sectional view taken as on lines XVII—XVII of Fig. XIII, showing the parts in assembled relation with each other;

Fig. XVIII is a face view of the power indicating disc of the cylindrical component;

Fig. XIX is a face view of various auxiliary components of the instrument;

Fig. XX is an enlarged sectional view of each of said components taken as on lines XX—XX through said respective components as illustrated in Fig. XIX;

Fig. XXI is a fragmentary perspective view of a part of the positional locating mechanism which is associated with each of the respective auxiliary components;

Fig. XXII is a slightly enlarged fragmentary sectional view taken as on line XXII—XXII of Fig. XIX, showing the operating mechanism of the respective auxiliary component;

Figs. XXIIIa to XXIIIm inclusive are fragmentary enlarged front views of the recording window and associated recording indicia for the spherical system of the instrument, illustrating how the plus spherical power readings are taken at different settings of said spherical units;

Figs. XXIVa to XXIVn inclusive are fragmentary enlarged front views of the recording window and associated recording indicia for the spherical system of the instrument, illustrating how the minus spherical power readings are taken at different settings of said spherical units; and Fig. XXV is a fragmentary enlarged sectional view taken as on line XXV—XXV of Fig. XIX.

Instruments of the character described are not new in the art, but much difficulty has been encountered with such prior art instruments in that they could not be placed in a desired close relation with the average run of patients to be tested. In many instances the restrictions in this respect greatly reduced the field of vision through the observation openings of the instrument, introduced a danger of having the patient accidentally engage the adjacent portions of the lens cells of the instrument with resulting injury and discomfort, and also introduced a confining or shut-in effect which resulted in an unfavorable reaction by the patient and introduction of error in the tests.

Another difficulty with many prior art instruments, due to this inability to position the lens cells in desired positional relation with respect to the eyes, was that an optical error was introduced by the resultant change of distance of the lenses from the eyes, as brought about by said inability to position them in desired relatively close relation with the eyes.

Another difficulty with many prior art instruments of this nature was that the various operable parts of the instrument could not be manipulated without danger of engaging and interfering with the patient under test, and in many instances the indicia by which the positional relation of the parts can be controlled were not directly visible from the front of the instrument.

Various other difficulties resided in the general construction of such prior art instruments, such as loosely supported lens cells which allowed the spaced relation of the lenses to move out of desired relation with each other during the adjustment of said cells, undesired points of friction which introduced annoying and obnoxious noises when the cells were operated, exposure of the lenses to a collection of dust, etc., and to becoming fogged by the breath of the patient and the general difficulty of manipulation and accurate adjustment of the various components of the instrument.

It, therefore, is one of the primary objects of the invention to overcome all of the above difficulties in such a manner that the resultant instrument has all of its components so related as to have free and positive movement relative to each other and yet be supported in compact relation with each other, so as to permit the instrument to be positioned in desired close relation with the eyes of the patient, regardless of facial contour, particularly spaced relation of the lens cells relative to said eyes, and to obviate the confining shut-in effect introduced by most prior art instruments of this nature.

The above, taken in conjunction with the remaining objects previously set forth, are the novel and characteristic features of the invention.

Referring more particularly to the drawings, wherein like characters of reference designate like parts throughout the several views, the device embodying the invention comprises a pair of spaced units 1 and 2, each attached as by screws or the like 3 to downwardly projecting tongues 4, carried by an adjustable head 5.

The units 1 and 2 each comprise a spherical component 6 as illustrated in Figs. VIII and X and a cylindrical component 7 as illustrated in Figs. XIII and XIV.

The spherical component 6 is contained within a housing 8 as illustrated in Figs. I, II, III, IX and X and the cylindrical component 7 is contained within a housing 9 as illustrated in Figs. I, II, XIII, and XIV.

One of the outstanding features of the invention resides in the particular shape and relation of the spherical housings 8 as illustrated in Fig. II.

It is to be noted that each of these housings has the shape of a frustum of a cone with the axes 10 of said conical housings so disposed as to intersect each other at the front or examiner's side of the instrument and to position the outside conical surfaces of the housings in such a relation that both surface portions 11 adjacent the eye positions will lie along substantially a straight line 12 in a direction transversely of the instrument in such a manner that a vertical plane tangent to both of said surface portions 11 will be substantially perpendicular to the lines of straight ahead vision of the eyes of an individual under test, as indicated by the dot and dash lines 13' and will be substantially parallel to a vertical plane tangent with the corneas of said eyes, as illustrated by the dot and dash lines 13. This causes the axes of sight or observation openings 15 in said housings 8 to be substantially coaxial with the lines of straight ahead vision 13'. See Figs. II, IX and X. The axes of the sight or observation openings 15 are substantially parallel with each other and when in correct position before the eyes are coaxial with the line of straight ahead vision of said eyes. This construction of housing enables the units 1 and 2 to be fitted in relatively close relation with the face. This is due to the fact that the tapered walls 11, as they progress upwardly and downwardly from the sight or observation openings 15, curve in a direction away from the face, thereby allowing said housings to be positioned in normally closer relation with the eyes without danger of abnormal engagement with the face of the individual under test. This curving away of the tapered or conical walls 11 of the housings 8, in addition to the angular disposition of said housings relative to each other, as illustrated in Fig. II, obviates the introduction of a confining or couped in effect to the patient and also provides clearance at the sides of the nose, so that the said housings may be adjusted in closer relation with each other than would be possible if they were not so angled. This also affords the examiner clear vision of the patient's eyes during the use of the instrument and during the initial positioning of the instrument before the eyes. The eye of the examiner is diagrammatically illustrated at 16 in Fig. II.

The particular angle of disposition of the respective housings 8 is quite critical as to the resultant overall width and thickness of the instrument and the size of lenses required in the instrument.

It has been found that usable instruments may be constructed within cone angle limits of from approximately 10° to 30°, as may be indicated by the lesser angle formed by the meeting of line 10 and an extension of line 13' in Fig. II.

The most desirable angle, however, is approximately 18°. This angle produces the desirable instrument from the standpoint of size, construction and face clearance. With this optimum angle of 18° the cells supporting the spherical lenses will have a desirable cone angle and the cells supporting the cylindrical lenses will have approximately half of said cone angle.

Increasing of the cone angle increases the resultant thickness of the units and thereby introduces a tunnel effect when looking through the observation openings of the instrument. This increase of cone angle also causes a rapid increase of overall width of the instrument. Decreasing of the cone angle from the 18° results in loss of face clearance and also increasing the couped in effect.

For ease of description we will first consider only the left unit 1.

The spherical component 6 of said unit as illustrated in Figs. VIII and X, comprises a plurality of discs 17, 18 and 19. In the disc 17 there is mounted a plus series of spherical lenses graded in steps of quarter diopters ranging from +.25 to +1.75 and a minus spherical series graded in quarter diopters ranging from —.25 to —1.00. The disc 18 has a series of relatively strong spheres 21 therein with a plus series graded in steps of three diopters ranging from +3.00 to +15.00 and a minus series also graded in steps of three diopters ranging from —3.00 to —18.00.

It is to be noted that each of the discs 17 and 18 is cupped to a shape simulating the shape of the housing 8, with the cupping such as to dispose the axis of each lens, when in alignment with the observation opening 15, in substantially coaxial relation with said opening and coaxial with the line of straight ahead vision through said opening when in correct position before the eyes of the patient. Contained within said spherical component there is a disc 19 having a plurality of openings 22 therein. These openings contain a red glass 23, —.12 diopter sphere 24, a blank opening 25, and a +.12 sphere 26. The disc 19 is also provided with a plurality of openings 27 in which is mounted a 6.0 prism 28, a 10.0 prism 29, a 15.00 prism 30, and a pinhole disc 31. It is to be understood that other lenses of different characteristics may be used if desired.

The housing 8 is provided with a stud 32 rigidly secured in a central opening in said housing. The stud 32 is provided with a flanged portion 33 which engages the bottom surface of a shouldered recess 34 formed centrally and internally of said housing. The stud 32 is retained in the opening in said housing by means of a screw or the like 35. This screw 35 also functions as retaining means for holding a corneal aligning attachment 36 on the rear of the housing and for holding a blade spring member 37 between said housing and said corneal aligning device.

Within the shouldered recess 34 internally of the housing 8 and on the flanged portion 33 of the stud 32 there is positioned a gear member 38. The gear member 38 is in constant mesh with a gear 39 also rotatably supported within the recess 34 by a screw or the like 40. The screw or the like 40 also supports a gear 41 in superimposed relation with the gear 39. The said gears 39 and 41 are secured to each other by screws or the like 42 so as to rotate as a single unit. The gear 38 is secured to a bearing sleeve 43 by screws or the like 44. The said bearing sleeve 43 is rotatably mounted on the stud 32. The bearing sleeve 43 forms a bearing on which the discs 18 and 19 are rotatably mounted. The disc 19 has a protrusion 45 on which is fitted a gear 46. The gear 46 is secured to the disc 19 by screws or the like 47 and is in constant mesh with the gear 41. The disc 19 is provided with an opening 48 through which the person assembling the unit may view the gears 41 and 46 so that they may be assembled in proper relation with each other.

The opposed end of the bearing sleeve 43 has an arm 49 secured thereto by screws or the like 50. A suitable lock pin 51 is adapted to anchor the arm 49 in desired relation with the sleeve 43. The arm 49 has a thumb piece 52 thereon which also provides an indicator member, as will be described more in detail hereinafter.

It is to be noted that upon manipulation of the thumb piece 52 to rotate the arm 49, the said arm being integrally connected with the sleeve 43 will impart a simultaneous movement to said sleeve. This movement of the sleeve 43 is transmitted through the integrally connected gear 38 to the gears 39 and 41, which, in turn, impart a rotary movement to the gear 46. The gear 46, being integrally connected with the disc 19, will cause said disc to rotate when the thumb piece 52 is moved. The purpose of the train of gears 38, 39, 41 and 46 is to cause a slight movement of the arm 49 to impart a relatively great rotary movement to the disc 19, so that the openings 22 and 27 in the disc 19 may be selectively moved into alignment with the observation opening 15. The thumb piece 52 on said arm is adapted to cooperate with a scale 53 on the face of the housing 8, as indicated in Fig. I. The scale is so graduated that the indicator 52 may be moved to selective positions thereon and thereby move the desired openings 22 and 27 into alignment with the observation opening 15.

The disc 18 is provided with a shouldered boss 54 which provides a bearing on which the disc 17 is rotatably supported and also provides means on which a scale plate 55 is secured as by screws or the like 56.

The disc 17, as shown in Fig. VIII, is provided with spaced concentric scale indicia 57 and 58. These indicia indicate fractions of a diopter which are added to the correction in alignment with the observation opening 15 when the disc 17 is progressively rotated.

It is to be noted that these scale indicia are graduated in quarter diopter steps. One of said scales, preferably the outer scale 58, has indicia of a given color indicating minus values, while the inner concentric scale indicia 57 are preferably of another color, indicating the plus quarter diopter values.

It is to be noted that each of the scales is divided into three sectors ranging from 0 to 75 in quarter diopter steps. The scale plate 55 for the left unit 1 has a plurality of openings 59 therein in concentric relation with the effective center of said plate and adapted to cooperate with the inner scale 57 and has a portion of its periphery cut away to provide angularly disposed edge apertures 60 concentrically arranged with the effective center 63 of said plate and at such a radius as to cause portions of the plate adjacent the edge apertures 60 to overlap the inner scale 57 and allow only the outer scale 58 to be visible.

The openings 59 are arranged in spaced progression concentrically with respect to the effective center 63 of the plate 55 and each has scale indicia 61 associated therewith. The said scale indicia 61 are preferably white and indicate the total plus power values of the total correction in alignment with the observation opening 15 as introduced by the spherical lenses of the respective discs 17 and 18, either separately or jointly. The said indicia range from 0 to 16 inclusive. Each of the angularly disposed edge apertures 60 are provided with scale indicia 62, preferably colored red, and indicating the total minus power values of the spherical lenses of the discs 17 and 18 which are in immediate alignment with the observation opening 15.

It is to be noted that lenses carried by the disc 17 cooperatively function with the respective lenses of the disc 18 and are so arranged that the power values of the lenses moved into alignment with the observation opening 15 may be built up progressively in steps of quarter diopters. The readings are taken through a window opening 64 formed in the front of the housing 8. The quarter diopter value readings are indicated in Figs. XXIIIa to XXIIId, starting from 0.00 to 0.75. As the disc 17 is rotated to advance one step further, the full power reading of 1.00 will be indicated as illustrated in Fig. XXIIIe. These readings are of the plus power values. It is to be understood that further rotation of the disc 17 causes the reading through the window opening as illustrated in Fig. XXIIIe to progressively change from 1.00 to 1.25, 1.50 to 1.75, whereupon the discs 17 and 18 are simultaneously rotated to move a lens contained in the disc 18 into alignment with the observation opening 15. This lens in combination with the lens contained in the disc 17 gives a total +2.00 power, as indicated in Fig. XXIIIf. This total +2.00 power is derived through the alignment of a +3.00 lens carried by the disc 18 and a —1.00 lens carried by the disc 17 with the observation opening. The disc 18 remains stationary and the disc 17 is then further rotated to introduce the remaining progressively arranged quarter diopter steps of —0.75 to —0.25, whereupon the blank opening in the disc 17 is aligned with the observation opening 15 and only the +3.00 lens will be in alignment with said observation opening. This is indicated by the movement of the .00 indication into alignment with the full +3 value indication of Fig. XXIIIf. Further rotation of the disc 17 will introduce progressively arranged .25 diopter steps of +.25 to +1.75, which steps, in combination with the existing +3.00, will give totals of +3.25 to +4.75 respectively. Further combinations are progressively built up in quarter diopter steps in a similar manner as that set forth above until the maximum +16.75 value is reached. The minus spherical lens values are built up in a similar manner to give totals ranging from 0.00 to —19.00 diopters.

In the left unit the plus quarter diopter value readings are taken through the opening 59 and the full diopter values from the scale 61 adjacent said openings, said totals are diagrammatically illustrated in Figures XXIIIa to XXIIIm.

The minus readings are as illustrated in Figs. XXIVa to XXIVn. The cooperative function of the edge apertures 60 and the window opening 64 produces a scale opening 65, in which the minus quarter diopter values are visible. The full power values of the minus component in alignment with the observation opening 15 is indicated by the scale indicia 62 adjacent said edge apertures 60. The minus scale indicia 62 and associated quarter diopter indications visible through the opening 65 are preferably red, so that the operator may immediately distinguish the minus scale. It is to be noted that the readings are in a progressive manner simulating those of the plus powers, so that the quarter diopter readings as indicated in Figs. XXIVb to XXIVd are in step by step progression as indicated at 66. The —1.00 value is determined by the alignment of the .00 with the —1 indication as indicated at 67 in Fig. XXIVe. When this point is reached both of the discs 17 and 18 are simultaneously rotated, whereupon an additional —1 indication as illustrated at 68 moves into alignment with the window opening 64 and a —.25 indication adjacent said —1 also moves into alignment with the window opening 64 as illustrated at 69 in Fig. XXIVf. The powers are then reduced in step by step progression until a —4.00 reading is visible in the window opening 64, whereupon both of the discs 17 and 18 are again rotated simultaneously to bring a —4.25 value into alignment with the observation opening 15. This being the result of a —6.00 lens in disc 18 and a +1.75 lens in disc 17. This value is indicated at 70 in Fig. XXIVg. This procedure is repeated until the maximum value of 19.75 is reached. The plus values of both discs 17 and 18 are increased positively by rotation in one direction and decreased positively by rotation in the opposite direction. It is to be noted by reference to Figs. I, II and VIII that the discs 17 and 18 are provided with corrugated peripheral edges which extend outwardly of the housing 8 at opposite sides of the units 1 and 2, so that the said discs 17 and 18 may be engaged and be manually operated by the examiner. The readings through the window openings 64 give the total spherical lens power values, plus or minus, of the immediate lens system in alignment with the observation opening 15.

The unit 2 on the right side of the instrument functionally is generally similar to unit 1 described above. It is to be noted, however, that the apertures 59 and 60 of the plate, corresponding to plate 55, are moved inwardly toward the center of said plate one position.

These apertures are moved inwardly because on the right side of the instrument, that is in unit 2, the whole numbers appear away from the center of the plate with respect to the decimal fraction numbers, while on the left side, or in unit 1, the whole numbers appear toward the center of the plate with respect to the decimal fraction numbers. The figures 57 and 58 in unit 2 are moved an amount corresponding to the shift of position of the respective apertures 59 and 60. It is to be noted that the order of the lenses is varied accordingly, so that the desired progressive values may be built up in the sight opening 15 of said unit.

It is to be noted that the plate 55 carrying the scale indicia 61 and 62 is located directly beneath the wall of the housing having the window opening 64 therein and are in a plane adjacent the plane of said window. This plate 55 is relatively thin so that the indicia 57 and 58 on the disc 17 are also relatively close to the plane of the window opening. Due to this fact the readings may be easily taken through said window. There is practically no depth resulting in undesirable side shadows and requiring looking directly into said window openings in order to take said readings. With the present arrangement the indicia are visible at relatively great side angles of observation.

To facilitate ease of manipulation and to retain the lenses 20 and 21 carried by the respective discs 17 and 18 in proper computed spaced relation with each other, there is provided a ball race 72 adjacent the respective series of lenses, that is, at a point substantially spaced from the main sleeve bearing 43 and boss 54 on which the disc 17 is rotatably mounted.

It is to be noted also that the discs 18 and 19 each have contiguous side bearing surfaces 73 adjacent the center thereof and are also each provided with spaced contiguous bearing surfaces 74 adjacent the respective series of lenses carried by said discs. The disc 19 and housing 8 also have contiguous side bearing surfaces 75 at a point spaced outwardly from the central bearing. This arrangement provides a smooth functioning assembly and prevents any undesirable axial movements between the discs and the housing and positively supports said discs in desired spaced relation with each other.

Each of the discs 17, 18 and 19 are provided with a plurality of spaced indents 76, 77 and 78. The indents 76 of the disc 17 cooperatively function with the bent end 79 of a spring finger 80 carried by the housing 8. The indents 77 of the disc 18 cooperatively function with the bent end 81 of an additional spring finger carried by the housing 8 and the indents 78 of the disc 19 cooperatively function with a roller member 82 carried by a spring finger 83 also supported on the housing 8 adjacent the first mentioned spring fingers. The purpose of these indents and respective spring fingers is to provide indexing means whereby the lenses of the respective series will be positioned in proper aligned relation with the observation opening 15.

The tension of the spring fingers cooperatively functioning with the indents 76, 77 and 78 may be varied by adjustment of the screw members 84.

The various lenses of the series carried by the disc 17, as illustrated in Fig. II, are mounted in said disc through the provision of a shouldered lip 85 in each of the openings in said disc. The lenses 20 are adapted to rest on the shouldered lip 85 and are preferably bevelled, as illustrated at 86, so as to receive the retaining rings 87. The rings 87 are provided with a tapered edge surface adapted to cooperatively function with the tapered edge surface 86 of the lenses and are held in engagement with said lenses by screws or the like 88, so that the lenses may be quickly and easily secured in the disc or removed therefrom. The lenses of the disc 18 are similarly held therein. It is to be noted, however, by reference to Fig. XII, that in some instances, particularly in instances where a strong plus power lens, such as illustrated at 89 is used, and the said lens cannot be made as large in diameter as the lenses 21 or 20, an auxiliary supporting ring 90 is provided. The ring is provided with a shouldered lip 91 simulating the lip 85 and the lens 89 is held on said lip by spinning over a flanged protrusion 92 on said auxiliary ring 90. The ring 90 and attached lens 89 are secured in engagement with the shouldered lip 85 in a manner similar to that previously described in connection with the lens illustrated in Fig. XI, that is, by means of a retaining ring 87 and screw members 88. In this instance the auxiliary disc 90 is provided with a tapered contour edge adapted to cooperatively function with the tapered edge surface of the ring 87.

The cylindrical component as illustrated in Figs. XIII, XIV, XVII and VIII, is contained in an auxiliary housing 9 secured to the front of the housing 8. This housing 9 is best illustrated in Figs. I, II, III and IX and is attached to the front of the housing 8 by screws or the like 93 extending through suitable aligned openings formed in flange-like lips 94 on said housing 8 and similar flanged lips 95 formed on the housing 9, see Fig. XIII. The various openings through which the attaching screws 93 extend are illustrated at 96. The openings 96 are preferably provided with a threaded bore to receive the threaded portions of the screws 93.

Each cylindrical component comprises a pair of discs 97 and 98. The disc 97 contains a series of relatively weak power cylinders 99 arranged in quarter diopter steps ranging from −0.25 to −1.00 and the disc 98 has a series of lenses 100 graded in 1.25 steps ranging from −1.25 to −5.00. It is to be understood, however, that these lenses may be plus cylinders if desired. This is to satisfy the requirements of the trade. In some instances the examiners prefer the use of minus cylinders, while in other instances the examiners prefer the use of plus cylinders, so that this phase of the invention is optional and the series of lenses carried by the respective discs 97 and 98 may be either plus or minus powers as desired. Each of the lenses 99 and 100 of the respective series carried by the discs 97 and 98 are rotatably supported in said discs.

It is to be noted by reference to Fig. XIV that the lenses 99 or 100, as the case may be, are respectively secured in annular-like supporting rings 101. Each of these rings is provided with a shouldered lip 102 on which the immediate lens is rested and are each provided with a flanged protrusion 103 which is spun over to secure the lens in said supporting rings 101. The rings 101 are each provided with a flange 104 having gear teeth 105 cut in the periphery thereof. The rings 101 are each provided with a shouldered portion 106 which rotatably engage an annular internal lip 107 formed in the respective openings in the discs 97 and 98. The supporting rings 101 are secured to the internal annular lip 107 by means of the retaining rings 108 held in secured relation with the supporting rings 101 by outwardly spun annular lip portions 109 formed on said ring. The gear teeth 105 of the supporting rings in the respective discs 97 and 98 all mesh with a gear 110. The gear 110 is rotatably supported in a shouldered recess 111 formed in the inner central surface of the disc 98. The disc 98 is secured to a hollow spindle 112, which, in turn, is rotatably supported by a stud 113 carried by the housing 9. The stud 113 is provided with an integral flange 114 which is seated within a recess 115 formed in the housing 9 and is rigidly secured therein by a screw 116.

It is to be understood that the pin 113 has a press fit with a suitable attaching opening 117 formed in the housing. The hollow spindle 112 has a reduced threaded extension 118 on which the disc 98 is positioned and secured by means of a clamp nut 119, so that the hollow spindle 112 and disc 98 are rotated on the stud 113 as an integral unit. The hollow spindle 112 to which the disc 98 is integrally attached, adjacent one end thereof, has a gear 121 secured thereto adjacent its opposite end. The gear 121 meshes with a gear 122 secured to a Geneva wheel 123. The Geneva wheel is rotatably supported on a central bearing 124 secured to the housing 9 by a screw or the like 125. The Geneva wheel 123, adjacent its end opposite the gear 122, has a star wheel flanged portion 126 adapted to be engaged by a pin 127 carried by the disc 97. The disc 97 is carried by a sleeve 128 rotatably supported on a tubular sleeve 129 which, in turn, is rotatably mounted on the inner hollow spindle 112. The sleeve 128 is provided with a pin 130 fitted within a slot 131 formed in an integral boss on the disc 97 and also has an integral gear portion 132 thereon. As shown in Fig. XIII, the gear 132 is in constant mesh with an idler gear 133 pivotally attached at 134 to the housing 9. The idler gear 133 is in constant mesh with a gear 135 attached to a spindle 136 having a thumb wheel 137 thereon. The spindle 136 also has a gear 138 secured thereto, by a screw or the like 139, which is in constant mesh with the gear disc 140. The gear disc 140, as illustrated in Fig. XVIII, is provided with scale indicia 141 which is visible through a window opening 142 in the front of the housing 9. See Fig. I. The disc 140 is rotatably supported on the housing 9 as illustrated at 143, and is merely for the purpose of indicating the power of the cylinder system in alignment with the observation opening 15. It is to be noted that the plane of the surface of the disc 140 having the scale indicia thereon is adjacent the plane of the window opening 142 so that direct vision of said indicia is facilitated.

It is to be understood that the housing 9 has an opening 15' in alignment with the observation opening of the housing 8. See Figs. I and XIII. It will be seen, therefore, that through rotation of the thumb wheel 137, the gear 135 is rotated and the idler gear 133 is simultaneously rotated. The gear 133, being in constant mesh with the gear 132, will impart a rotary movement to the sleeve 128. The sleeve 128 and disc 97 having a pin and slot connection 130 and 131, will, in turn, cause said disc 97 to be rotated. The rotation of the disc 97 will successively align the lenses 99 with the observation opening 15.

It is to be noted that when the disc 97 is rotated the gear portions 105 of the lens supporting rings 101, meshing with the gear 110, will be rotated in said disc 97. This is due to the fact that the gear 110 is held stationary during said rotation of the disc 97. The gear 110 is connected to the tubular sleeve 129 by a pin 145 and is, therefore, held stationary through said connection during the rotation of the disc 97. This causes the axes of the lenses 99 carried by said disc 97 to assume a definite meridional position when in alignment with the observation opening 15. The pin 127, during the rotation of the disc 97, intermittently engages the star wheel 126 at every complete cycle of movement of the disc 97. The star wheel 126 in turn rotates the gear 122 which is in constant mesh with the gear 121 and thereby imparts a rotary movement to the hollow spindle 112. The hollow spindle 112, having the disc 98 rigidly attached thereto adjacent its opposed end, causes the said disc 98 to move an amount sufficient to advance a lens 100 carried by said disc into alignment with the observation opening. The disc 97 then rotates one complete cycle of movement, whereupon the Geneva mechanism will advance another lens 100 into alignment with the observation opening.

It is to be understood that the axes of the lenses 99 and 100 are coincident with each other when the said lenses are aligned. Due to the meshing of the gear portions 105 with the gear 110, the axes of the respective lenses in alignment with the observation opening will remain coincident with each other when the respective lenses 99 and 100 are rotated. The sleeve 129 is provided with a flange-like gear 146 which is in constant mesh with a gear 147 on a tubular member 148 rotatably mounted in the observation opening 15. This tubular member 148 is to provide means for receiving auxiliary lenses such as illustrated in Figs. XV and XVI.

It is to be noted that the tubular member 148 has a ring 149 secured thereto by screws or the like 150. The ring 149 is provided with an opening 151 in which a locating pin 152, carried by the auxiliary attachments, is adapted to be positioned. The auxiliary attachments have annular-like portions 153 in which the auxiliary lenses 154 are secured. Said annular-like portions are adapted to be positioned in telescoped relation with the tubular member 148 with the locating pin 152 functioning to align the axis of the lens 154 in coincident relation with the axes of the lenses 99 and 100 respectively.

It is to be noted that when the tubular sleeve 129 is rotated, the gear portion 146 thereof, in mesh with the gear 147 of the tubular member 148, will rotate the auxiliary lens simultaneously to the rotation of the lenses 99 and 100 with respect to their supporting discs 97 and 98. This rotation is to alter the direction of the axes of the lens system before the eye and is brought about the manipulation of a thumb wheel 155 mounted in adjacent concentric relation with the thumb wheel 137. The thumb wheel 155 is carried by a hollow shaft 156. The hollow shaft 156 is secured to the thumb piece 155 by a nut or the like 157 and is rotatably supported in a bushing 158 carried by the housing 9. The hollow shaft 156 provides a bearing for the spindle 136 and is provided on its inner end with a gear 159 in constant mesh with an idler gear 160 pivotally supported on a shouldered bearing member 161 secured to the housing 9 by screws or the like 162. The gear 160 is in constant mesh with the gear 146 on the tubular sleeve 129. It will be noted, therefore, that when the thumb wheel 155 is rotated, the gear 159 meshing with the idler gear 160, which, in turn meshes with gear 146, will rotate the tubular sleeve 129. The tubular sleeve 129 will, therefore, impart a rotation to the integral gear portion 146 and to the gear 110 through the pin connection 145. The gear 110 will simultaneously rotate the lenses 99 and 100 and the gear 146 will also simultaneously rotate the tubular member 148 and the auxiliary lens supported by said tubular member. In this manner the lenses in immediate alignment with the sight openings of the instrument may be rotated to shift the direction of the axes thereof without changing the coincident relation of said axes. It is to be understood that the dimensions of the various gears are such that this result is attained.

The housing 9 is provided on its face adjacent the thumb wheel 155 with a protractor scale 163. See Figs. I and XVII. The thumb wheel is provided with an indicator member 164 adapted to cooperatively function with the protractor scale 163.

With the above arrangement, it will be seen that as the disc 98 is rotated through its connection with the thumb wheel 137, the lenses 100 in said disc may be successively aligned with the observation opening of the unit and that at the completion of each cycle of rotation of said disc 98, the Geneva mechanism will automatically function to advance the disc 97 an amount sufficient to move another lens of said disc into alignment with the observation opening.

The discs 97 and 98 are each provided with a plurality of indents 165 and 166 in spaced relation in the periphery thereof. These indents 165 and 166 are adapted to engage respective roller members 167 and 168 carried by spring arms 169. The rollers 167 and 168 are adapted to cooperatively function with the indents 165 and 166 to automatically and positively position the lenses in alignment with the observation opening.

To aid in retaining the auxiliary attachments, such as illustrated in Figs. XV and XVI, internally of the tubular member 148, there are provided friction spring bars 170. See Figs. XIII and XIV. These spring bars 170 are adapted to exert a pressure on the side surface of the annular portions 153.

It is to be noted that the discs 97 and 98 are cupped so as to cause the lenses 99 and 100 to assume a coaxial relation with the line of sight through the observation openings.

To provide a smooth functioning connection, a spring washer 171 is positioned between the thumb wheel 155 and the adjacent supporting mechanism.

To insure that the lenses, 100 and 154 will maintain a fixed axis as the discs 97 and 98 are rotated, there is supplied an anchoring friction element 310. This friction element 310 is between the housing 9 and the gear 159. The friction washer 171 is adapted to urge the gear 159 into binding relation with the friction element 310 and the said gear is thereby frictionally held in non-rotary relation with respect to the housing 9. The gear 159 being in constant mesh with the gear 160 will hold said gear stationary and also hold the associated lens rotating mechanism stationary.

It is to be noted that the shoulder bearing member 161 may be adjusted by loosening the screw 162 so that the gear members may be positioned in relatively intimate meshed relation with each other to eliminate backlash. This adjustment is retained by thereafter tightening the screw 162. Similar arrangement is provided throughout the instrument to take up backlash in the gear assemblies.

It is to be noted that the scale 141 is graduated in quarter diopter steps and is such that it covers a complete range of cylinder powers and indicates the actual power of the cylindrical lens system before the eye, regardless of whether it is plus or minus. If the minus lenses are used it is assumed that the indications are minus powers, and vice versa.

The cylinder component may be disassembled for lens cleaning and for interchanging plus and minus cylinders by removing the cylindrical housing unit from the instrument. This is accomplished by removing the screws 93. The dials 97 and 98 are in turn disassembled by removal of the nut 119. To facilitate the dial removal the index rollers 167 and 168 are removed from contact with periphery of discs by removing screw 311 and swinging the spring support block on the pin 312. This releases the tension of the spring arms 169.

To assure proper axial relationship of the cylinder lenses 99 with cylinder axis scale 163, when reassembling the annular supporting ring 101 are supplied with indicia $a$ to match with corresponding indicia $b$ on the disc 97. The gear 110 and the disc 98 are similarly provided with indices $c$ and $d$. It is to be understood that these marks are used in conjunction with the proper scale setting of 163. This setting being preferably the zero position.

As previously described, the units 1 and 2 are separately attached to downwardly projecting tongues 4. The tongues 4 fit within slotted webs 172 carried by the housing plate 9. The downwardly projecting tongues 4 are each carried by slide members 173 and 174. See Figs. IV and V. The slide members are slidably supported in a slide block 175 pivotally supported by bearing members 176 carried by the yoke 177. The bearing members 176 are locked with said yoke by screws or the like 178. A face plate 179 slidably supports the slide members 173 and 174 internally of the slide block 175. The frictional pressure of said plate on said slide members may be controlled by adjustment of screws or the like 180. The slide members 173 and 174 are slotted to receive a shaft 181 rotatably supported in the bearing members 176. The shaft 181 has a hand wheel 182 thereon and has a pinion 183 centrally thereof immediately positioned within the slotted portions of the slide members 173 and 174. The slide members 173 and 174 are respectively provided with rack members 184 in constant mesh with the pinion 183, so that when the pinion is rotated by manipulation of the hand wheel 182, the said slide members 173 and 174 may be moved longitudinally of the slide block 175 and in this manner the units 1 and 2 carried by the downwardly projecting tongues 4 of said slide members will be moved outwardly or inwardly relative to each other so as to change the distance therebetween. The plate 179 is provided with a window opening 185, through which is visible a scale 186 carried by the slide member 174. The scale 186 is secured to the slide member 174 by screws or the like 187. The scale 186 is adapted to cooperatively function with an indicator mark 188 on the other of said slide members. This scale and indicator means is adapted to determine the interpupillary distance between the observation openings of the respective units, so that the spacing between the centers of the opening may be set substantially to the distance between the pupils of the immediate patient to be tested.

The ends of the block 175 and plate 179 are covered by shield-like members 309 so as to produce a relatively smooth outer contour surface. It is to be understood that the edges of the shield-like members are in flush relation with the upper, lower, and side surfaces of the block and plate. The shields 309 are secured in position by screws or the like 310. The shield on one end forms backing means for the coil spring 196 so that the plunger 195 and spring 196 may be inserted into the longitudinal bore in the upper portion of the block 175 and sealed therein by the adjacent plate 309. A similar bore was provided on the opposite side in which the spirit level 197 is positioned. This bore is likewise sealed by the adjacent plate 309.

It is to be noted that spacing washers 311 are provided between the branches of the yoke 177 and the adjacent side surfaces of the block 175 and plate 179.

Block 175, carrying the units 1 and 2, as specified above, is supported for pivotal tilting movement with respect to the yoke 177. To control the position of angle of tilting, the block 175 is provided with a cam member 189 secured thereto by screws or the like 190. The cam member 189 is adapted to be engaged by the ball end 191 of an adjustable screw member 192, threadedly supported in the upper portion of the yoke 177. The screw member 192 is provided with a thumb wheel 193 by which it may be rotated to cause the ball end 191 to move toward and away from the cam member. The said cam member has a surface 194 which is so angled as to cause the slide block 175 to be tilted about its pivotal connection with the yoke 177. The cam member is normally urged into engagement with the ball end 191 of the screw 192 by a plunger 195 normally engaging the side of the yoke 177 and constantly urged into engagement with said yoke by a coil spring or the like 196.

It is to be noted that the plunger exerts a pressure on the side wall of the yoke 177 and causes the slide block 175 and the cam member 189, carried by said block, to be urged into engagement with the ball end 191 of the screw. When the screw member is adjusted downwardly the plunger 195 will be compressed and will cause the head 5 and the units 1 and 2 carried thereby to be tilted about the pivot 176 as a center. In this manner the observation openings may be positioned in exact horizontal position or moved into alignment with the eyes of the observer. The block is provided with a spirit level 197 by which the instrument may be levelled in this direction. The yoke 177 is provided with a neck 198. The neck 198 has a sleeve 199 rotatably supported thereon. The sleeve 199 has a projection 200 to which a connection member 201 is hinged so as to swing upwardy about a pivotal connection 202. The projection 200 is provided with a hardened pin 203 with which a screw member 204, carried by the member 201, is adapted to engage. This screw member 204 forms stop means for limiting the downward swing of the member 201. The member 201 is adapted to receive a hollow bar-like support 205 which is placed in telescoping relation with a reduced protrusion 206 of said member. The member 205 is adapted to support a near test card holder 207. See Figs. II and III. The said holder 207 has a reduced extension 208 rotatably supported in the hollow bore of a depending member 209. The reduced portion 208 is provided with a circumferential groove 314 and is rotatably supported in the member 209 by a screw or the like 315 having an end fitting within the circumferential groove 314. The said reduced portion 208 is also provided with a transverse opening aligned with openings 316 formed in the side walls of the depending portion 209. Positioned within the transverse opening in the portion 208 there is a coil spring 317 constantly urging ball members 318 in an outward direction. The ball members 318 are adapted to interengage with the openings 316 when the member 207 is rotated to position said ball members in alignment with said openings 316. The openings 316 are of a slightly smaller diameter than the diameter of the ball members 318 so that the ball members cannot be ejected from the assembly. This arrangement provides a pivotal connection between the members 207 and 209 whereby the card holder may be reversed with the ball members 318 and openings 316, providing means for automatically locating the said holder substantially perpendicular to the line of straight ahead vision through the sight openings of the instrument. The upper end of the member 209 is provided with a slide connection 210 with the bar member 205, so that the card holder 207 may be moved in a direction longitudinally of the bar toward and away from the instrument. The card holder 207 is provided with spring fingers 211 for holding the card therein. Due to the fact that the sleeve 199 is rotatably supported on the neck 198, said card holder may also be swung in a direction sidewise if desired. To locate the bar 205 in desired extended position in front of the instrument, the sleeve member 199 is provided with a plunger 212 urged by a coil spring or the like 213 into engagement with a location opening 214 formed in a member carried by the neck.

The upper end of the neck has the coupling member 215 rotatably supported thereon. The coupling member 215 is held on said neck member by a split nut 216 and is frictionally held in adjusted position by a spring washer or the like 217 located between the split nut 216 and the adjacent portion of the coupling member 215.

It is to be noted that the coupling member 215 is recessed so as to receive the spring washer 217 and nut 216. The nut 216 is locked in adjusted position by a binding screw or the like 218. The coupling member 215 has a hollow portion 219 in which a crossbar 220 of a floor stand or the like is adapted to be placed. The portion 219 has a threaded part 221 and an adjacent end provided with a plurality of slots 222. This slotted portion has a tapered ridge 223. A nut 224 is adapted to be threaded on to the threaded part 221 and is provided with a tapered inner wall portion 225 adapted to engage the tapered surface of the ridge 223, and, by tightening the nut on the threaded part 221, causes the fingers produced by the slotted portions to be forced into binding relation with the crossbar 220 and lock said coupling member on the bar.

The slide block 175 is provided adjacent the bottom thereof with a transverse slideway 226 in which a forehead rest 227 is slidably mounted. The headrest is provided with a portion slidably mounted in the slideway 226 and is provided with a threaded bore 228 adapted to receive a screw member 229. The screw member 229 has a thumbpiece 230 by which it is rotated. The portion of the headrest having the threaded bore is provided with a longitudinal slot 231 in which is fitted a key screw 232 which is adapted to prevent rotation of said headrest when the screw 229 is adjusted. The headrest is preferably formed of molded material such as Bakelite or other substances having a low thermo-conductivity. A suitable stop pin 233 is provided for limiting the outward movement of the headrest in the slideway 226.

The top of the slide block 175 is provided with an additional spirit level 234 disposed in normal relation with the first spirit level 197 so as to enable the instrument to be levelled in complete horizontal position.

The rear face of each of said units 1 and 2 is provided with a corneal aligning device 36 which has been previously specified as being secured in position by means of a screw or the like 35. This corneal aligning device as shown in Figs. II, III, IX and X is provided with a member 235 which is hinged at 236' so that it may be swung outwardly to a position such as illustrated in Fig. X or downwardly into substantially flush relation with the back of the unit. The blade spring or the like 37 is adapted to engage the inner cam end of said member so as to hold it in its outwardly extended position or to engage the side surface of said member when folded downward so as to retain it in said downward position. The member 235 is provided with a slot 236 having scale graduations 237 adjacent one of its longitudinal edges. See Fig. IX. The said aligning device is also provided with a sighting member 238 which is adapted to be aligned with the cornea of the eye by sighting through the slot 236 and aligning a selected graduation of the scale 237 with the sighting device 238 and with the front of the cornea of the eye. In this manner the instrument may be located in desired position before the eye so as to place the lenses of the respective units at the desired distance from the front surface of the cornea of the eye. The forehead or brow rest 227 is adjusted inwardly or outwardly so as to obtain the desired alignment. A corneal aligning device is provided on each cell so that both of the cells may be properly aligned with the respective eyes of the patient. This is an extremely important factor in order to obtain accurate prescriptive values during the test, as a shift of the position of the instrument relative to the corneas of the eyes will introduce error. It is to be understood that the lenses are computed so as to produce accurate prescriptive values when located at a given distance from the corneas of the eyes.

It has been previously stated above that a consideration in the computation of these lenses was the spaced relation thereof and this is positively retained through the mechanism used in supporting the lenses.

Since the additive feature depends on critical lens design and constructional lens separation, we are better able to maintain exact lens separations because with the cone design the discs can be conveniently supported in positive spaced relation with each other immediately adjacent the location of the lenses in said discs.

The spring 37 has an end 239 by which a sanitary pad or the like 240 may be held around the observation opening of the instrument so that the face of the patient will not come in direct contact with the instrument. These sanitary pads are interchangeable by merely slipping them out from under the end 239 of the spring. The pad is held at its side opposite the end 239 by a pin or the like 241. See Fig. IX.

Each of the units 1 and 2 is provided with a forwardly extending stud 242 on which is supported a plurality of auxiliary attachments which may be swung into and out of alignment with the observation opening of each unit. These auxiliary attachments comprise preferably a pair of rotary prisms 243, Maddox rod 244, and a cross cylinder 245. On the studs 242 there is provided a plurality of wedge blocks having an angled face 246. These wedge blocks are secured to the stud by screws or the like 247. The auxiliary attachments 243, 244, and 245 each have an arm 248 pivotally connected to said stud 242 adjacent each of the wedge blocks. Each of the arms has a cup-like member 249 fitted over each adjacent wedge block. Each of the arms and cup-like members has a stop pin 250 therein which is adapted to engage the end 251 of suitable stop screws 252 provided in each of the wedge blocks. The screw members 252 provide means whereby the prisms 243, Maddox rod 244, or cross cylinder 245 may be positioned in accurate alignment with the observation opening. Each of the arms and cup-like members also has a spring pressed indexing plunger 253 carried thereby. Said plungers have a tapered end 254 which is adapted to engage with the angled face 246 of the adjacent wedge block. When the arms 248 are swung in a sidewise direction the plungers 253 automatically cam in against the resiliency of the coil springs or the like 255. The said plungers 253, therefore, function to hold the auxiliary members in alignment with the sight opening and out of alignment therewith positively. A plate 256 is secured to the outer end of the stud 242 by a screw or the like 257 to hold the assembly thereon.

The rotary prisms 243 are respectively held in annular members 258 and 259. Each of said annular members has a gear portion 260 and 261 thereon. The annular member 258 has a ledge 262 internally thereof on which the prism 243 is adapted to be rested. A ring 263 is fitted within the annular member and is held therein by a plurality of screws or the like 264. The said rings 263 have an inner bevelled edge adapted to engage a similarly bevelled contour of the respective prism so as to hold the said prism rigidly therein. The annular member 259 has an outer tapered edge 265 and has positioned concentrically therewith a ring member 266 having an outwardly flared portion with an angled surface 267 adapted to engage the outer angled edge 265 of the annular member. The ring 266 has a ledge 268 internally thereof on which the respective prism 243 is rested. A metal retaining ring 269 is positioned internally of the ring 266 and is held therein by a plurality of screws or the like 270. The retaining ring 269 has an inner bevelled edge adapted to engage a similarly bevelled contour on the respective prism and rigidly holds the said prism in said ring member 266. The ring member 266 is detachably connected with the annular member 259 by screws or the like 271. See Fig. XXV.

The purpose of this invention is to provide means whereby the ring 266 and prism 243 supported thereby may be removed from the annular member 259 as an integral unit so that the opposed surfaces of said prism may be quickly and easily cleaned, and the inner surface of the opposed prism 243 may also be cleaned, as well as the outer surface thereof. The annular members 258 and 259 are rotatably supported in a housing 272, which, in turn, is rotatably supported in the arm 248. The rotation of the ring 272 provides means whereby the major axis of the prisms may be changed. A suitable spring clip member 273 is provided to index the housing 272 at different angular positions. The spring finger 273 functions in cooperation with a plurality of suitable indents 274 formed in the outer surface of the member 272. The member 272 is held in rotatable connection with the arm 248 by a flanged ring 275 which is secured to said member 272 by screws or the like 276. See Fig. XX. The housing 272 is provided with an outwardly projecting arm 277 to facilitate rotation of the prisms in the arm 248. The arm 277, as shown in Fig. XXII, comprises a hollow tube-like member threadedly connected as illustrated at 278, to the housing 272. The arm 277 provides a bearing in which is rotatably mounted a stem 279. The stem is provided adjacent its inner end with a gear member 280 which meshes with both of the gear portions 260 and 261 of the annular members 258 and 259. The stem 279 is provided adjacent its opposite end with a thumbpiece 281. A suitable spring washer 282 is provided intermediate the end of the arm 277 and the thumbpiece 281. By rotating the thumbpiece 281, the prisms 243 carried by the respective annular members 258 and 259 may be simultaneously rotated in opposite directions so as to increase or decrease the effective power produced by said prisms. The face of the flanged ring 275 is provided with a scale 283 by which the effective power of the prism is read.

The Maddox rod 244 is secured internally of a disc 284 which, in turn, is pivotally connected with the respective arm 248. The disc 284 is provided with a ledge 285 on which said Maddox rod is rested, and is provided on its opposite side with burnishing edge 286, which is spun inwardly to hold the Maddox rod on the ledge 285. The disc 284 has a ring 287 secured thereto by screws or the like 288 so as to hold the said ring in pivotal connection with the major arm 248. The said ring 247 has an outwardly extending tongue 289 which may be grasped to rotate the Maddox rod relative to the arm 248. The ring 287 is provided with a plurality of indents 290 cooperatively functioning with a spring finger 291 which locates and holds the axis of the Maddox rod in desired position.

The cross cylinder 245 is carried by a ring member 292 and attached to a stem 293 which is pivotally mounted in an annular member 294. The cross cylinder 245 is held in the ring 292 by a snap-in ring 295. The stem 293 is provided with opposed slots 296 forming flat side surfaces which are engaged by a hairpin type spring 297. The spring 297 is mounted in an annular groove 298 in the annular member 294 and is held in restricted position in said groove 298 by pin members 299 and 300. The hairpin spring 297 straddles the flat faces of the stem 293 internally of the grooves 296, so that when the stem 293 is rotated the hairpin type spring locates the rotary cylinder 245 in the plane of the arm 248. With this arrangement the cross cylinder may be quickly reversed with the hairpin spring exerting a pressure on the opposite sides of the stem 293 and tending to automatically seat with the flat surfaces internally of the grooves 96. The cross cylinder is adapted to be quickly reversed by a flipping action.

It is to be understood that the ends of the spring 297 are bent inwardly so as to tend to squeeze the sides of the stem. The annular member 294 is rotatably supported in its respective arm 248 by an annular plate-like member 301 which is secured to the annular member by screws or the like 302. The annular member is provided with a plurality of indents 303 which cooperate with a spring finger 304 carried by the arm 248. This is to allow the axes of the cross cylinder to be shifted to different meridians. The face of the arm 248 is provided with a protractor scale 305 whereby the position of the axes of the cylinder may be determined. A spring washer or the like 306 tends to take up any looseness and play in the pivotal connection of the stem.

It is also to be noted that the face of the Maddox rod arm 248 is provided with a protractor scale 307 by which the axis of the Maddox rod may be determined.

The use of the instrument is substantially as follows:

The spherical discs 17 and 18 are first rotated to zero position as indicated through the window opening 64 in Fig. I. The blank opening 25 in the disc 19 is aligned with the observation opening 15.

The blank openings 308 in the cylinder discs 97 and 98 are rotated into alignment with the observation opening 15. This places the cylinder system at the zero setting.

The instrument is then adjusted to desired positional relation with the eyes 14 of the patient through the use of the corneal aligning devices 36 and spirit levels 197 and 234. The observation openings 15 are then aligned with the eyes 14 of the patient by manipulation of the hand wheel 182 which increases or decreases the space between the units 1 and 2.

The test is made either with a near or distant object or chart. The patient is told to view said chart and is questioned as to clarity of vision during the intermittent combining of different lenses of the respective series before the eyes. When the best correction has been obtained, the powers of the lens system before the eyes is determined by taking the readings at the respective window openings 64 and 142. The readings at the window opening 64 give the plus or minus spherical values, while the readings at window openings 142 give the cylindrical lens power. The axial position of the cylinder is noted by reading the position of the indicator 164 on the degree scale 163.

The spherical systems are manipulated manually by engaging the corrugated peripheries of the respective discs.

The cylinder system is operated by means of the concentric thumb wheels 137 and 155.

Further cylindrical and spherical lens values may be introduced by auxiliary lenses such as shown in Figures XV and XVI. Optional auxiliaries may also be inserted in the auxiliary cell 153 such as stenopaic slit or additional prisms, etc. The method of use of the remaining auxiliary loops 148 and auxiliary dial 19 is as known in the art.

From the foregoing description it will be seen that simple, efficient and economical means and methods have been provided for accomplishing all of the objects and advantages of the invention.

Having described our invention, we claim:

1. In an eye testing instrument the combination of a plurality of lens cells having a series of lenses therein for selective movement into and out of alignment with the eyes of an individual under test, said lens cells being rotatable about a common axis, one of said cells having indicia on one side thereof for indicating, in part, the optical value of the lenses in alignment with the eyes, the other of said cells being located on the side of said first cell opposite the surface having the indicia thereon, and a disc of less diameter than the cells carried by the other of said cells in overlying relation with the side surface of the first cell on the side thereof having the indicia thereon with said first cell being located between the disc and the other cell and having relation with cut away portions through which said indicia may be viewed and indicia on said disc adjacent said cut away portions adapted to function cooperatively with the indicia on said first cell for indicating the total power value of the lenses in alignment with the eyes.

2. In an eye testing instrument the combination of a housing having a sight opening and a spaced window opening therein, a plurality of lens cells having a series of lenses therein for selective movement into and out of alignment with said sight opening, said lens cells being rotatable about a common axis, one of said cells having indicia on one side thereof for alignment with said window opening for indicating, in part, the optical value of the lenses in alignment with the sight opening, the other of said cells being located on the side of said first cell opposite the surface having the indicia thereon and a disc of less diameter than the cells carried by the other of said cells in overlying relation with the side surface of the first cell on the side thereof having the indicia thereon with said first cell being located between the disc and the other cell and having cut away portions through which said indicia may be viewed at said window opening, said disc having indicia adjacent said cut away portions adapted to be viewed through said window opening and to function cooperatively with the indicia on the first cell for indicating the total power value of the lenses in alignment with the sight opening.

3. In an eye testing instrument the combination of a plurality of lens cells having a series of lenses therein for selective movement into and out of alignment with the eyes of an individual under test, one of said cells being rotatable about a given axis and having a pivot bearing protruding from one side thereof and the other of said cells being mounted on said pivot bearing for rotation relative to said first cell about a common axis, said other cell having indicia on the side thereof opposite the first cell for indicating, in part, the optical value of the lenses in alignment with the eyes and said pivot bearing having a disc of smaller diameter than the cells mounted thereon in overlying relation with the side surface of said other cell having the indicia thereon with said other cell lying between the first cell and said disc, said disc having a cut away portion through which said indicia may be viewed and indicia on said disc adjacent said cut away portion adapted to function cooperatively with the indicia on said other cell for indicating the total power value of the lenses in alignment with the eyes.

4. In an eye testing instrument the combination of a housing having a sight opening and a spaced window opening therein, a plurality of lens cells in said housing having a series of lenses therein for selective movement into and out of alignment with the sight opening, one of said cells being mounted for rotation about a given axis for selective alignment of the lenses therein with the sight opening and having a pivot bearing protruding from one side thereof and the other of said cells being pivotally mounted on said pivot bearing for rotation about a common axis relative to said first cell, said other cell having indicia on the side surface thereof opposite the first cell adapted to be viewed through said window opening when the lenses of said cell are selectively aligned with the sight opening, a disc of smaller diameter than the cells carried by said pivot bearing of said first cell and overlying the side surface of the other cell having the indicia thereon and having a cut away portion through which said indicia may be viewed and also having indicia thereon adjacent said cut away portion adapted to function cooperatively with the indicia on said other cell for indicating the total power value of the lenses in alignment with said sight opening.

5. In an eye testing instrument the combination of a plurality of lens cells having a series of lenses therein for selective movement into and out of alignment with the eyes of an individual under test, one of said cells being pivotally supported for rotation about a given axis and having a pivot bearing thereon, the other of said cells being aligned with said first cell and having indicia on the side surface thereof opposite the first cell for indicating, in part, the optical value of the lenses in alignment with the eyes, a disc of smaller diameter than the cells carried by said pivot bearing of said first cell and overlying the side surface of the second cell having indicia thereon and having a cut away portion through which said indicia may be viewed, said disc having indicia thereon adjacent the cut away portion adapted to function cooperatively with the indicia on said second cell for indicating the total power value of the lenses in alignment with the eyes and means interconnecting said first cell with the second cell whereby said second cell will be operated an amount simulating the distance between the centers of the lenses of said cell when said second cell is rotated substantially one complete cycle of movement.

6. In an eye testing instrument the combination of a support having a sight opening and a spaced window opening therein, a plurality of lens cells each having a series of lenses therein for selective movement into and out of alignment with the sight opening, one of said cells being pivotally connected to said support for rotation about a given axis and having a pivot bearing thereon, the second of said cells being pivotally mounted on said pivot bearing and having indicia on the side surface thereof opposite the first cell alignable with the window opening for indicating, in part, the optical value of the lenses in alignment with the eyes, a relatively thin disc mounted on said pivot bearing of said first cell and overlying the side surface of the second cell having the indicia thereon with the second cell lying between the first cell and the disc, said disc having a cut away portion through which the indicia aligned with the window opening may be viewed and also having indicia thereon adjacent said cut away portion alignable with the window opening adapted to function cooperatively with the indicia on said second cell for indicating the total power value of the lenses in alignment with the sight opening and means operably connecting said lens cells whereby substantially one cycle of movement of said second lens cell will impart a movement to said first lens cell substantially the amount of the distance between the centers of the lenses of said cell.

7. In an eye testing instrument the combination of a support and a window opening therein, a plurality of lens cells pivotally supported on said support in superimposed relation with each other and each having a series of lenses for selective movement into and out of alignment with the sight opening, the front one of said cells having fractional indicia on the front side thereof alignable with the window opening and the other of said cells having the disc member connected therewith and positioned to overlie the front side surface of the cell having the indicia thereon and having cut away portions for rendering said indicia visible at said window opening and also having indicia of full numerical value adjacent said cut away portion adapted to function cooperatively with the indicia on the side surface of the lens cell which it overlies for indicating the total power value of the lenses in alignment with the sight opening and means carried by said support having a portion adapted to be aligned with the front corneal surface of the eye of an individual under test aligned with the sight opening for locating the lenses at a given distance in front of the eye so that the lenses will have substantially the prescriptive power indicated by the numerical values visible at the window opening.

8. In an eye instrument a unit embodying a support having a sight opening therein and spaced window openings, a plurality of lens cells rotatably mounted on said support, said lens cells each having a series of lenses therein for selective movement into and out of alignment with the sight opening, said cells being divided into two groups with one of said groups being rotatable about a common axis and the other rotatable about a common axis offset relative to the axis of the first group, each of said groups having a normally separate disc associated therewith and adapted to be rotated during the rotation of at least one of said cells of each respective group and having indicia thereon which at least, in part, indicates the value of the lenses of said respective groups aligned with the sight opening, one of said discs being smaller in diameter than the lens cells with which it is associated and being mounted to rotate about the same axis as said cells.

9. In a device of the character described a pair of housings supported for movement toward and away from each other in a substantially sidewise direction, each of said housing having a sight opening therein and a plurality of lens cells carried thereby, said lens cells each having a series of lenses adapted for movement into and out of alignment with the sight opening, one of said cells having a disc of smaller diameter connected thereto for rotation therewith and the other of said cells being pivotally supported between said disc and said first cell with the said disc overlying a portion of the side surface of said other cell, said side surface of said other cell having indicia thereon for indicating, in part, the value of the lenses aligned with the sight opening and the said disc having indicia thereon cooperatively functioning with the indicia on the side surface of said other cell for indicating the total power value of the lenses aligned with the sight opening.

10. In a device of the character described a pair of housings supported for movement toward and away from each other in a substantially sidewise direction, each of said housings having a sight opening therein and a plurality of lens cells carried thereby, said lens cells each having a series of lenses adapted for movement into and out of alignment with the sight opening, one of said cells having a relatively thin disc of smaller diameter than the lens cells mounted thereon for rotation therewith and the other of said cells being pivotally supported between said disc and said first cell with the said disc overlying a portion of the side surface of said other cell, said side surface of said other cell having indicia thereon for indicating, in part, the value of the lenses aligned with the sight opening and the said disc having indicia thereon cooperatively functioning with the indicia of the side surface of said other cell for indicating the total power value of the lenses aligned with the sight opening, each of said housings having corneal aligning means thereon for positioning the lenses of said lens cells at a proper spaced position before the eyes whereby the indicia indicating the value of the lenses aligned with the sight openings will give the accurate prescriptive value of the permanent lenses to be worn before the eyes.

11. In an eye testing instrument the combination of a support having a sight opening and a window opening therein, a plurality of lens cells pivotally supported on said support, each of said cells having a series of lenses therein computed for use at a given test distance before the eye of an individual under test and being adapted for selective movement into and out of alignment with the sight opening, one of said cells having indicia on one side thereof for indicating, at least in part, the optical value of the lenses in alignment with the eye and a relatively thin disc of smaller diameter than the lens cells carried by the other of said cells and overlying the side surface of the cell having the indicia thereon and having a cut away portion through which said indicia may be viewed, said disc having indicia thereon adjacent the cut away portion adapted to function cooperatively with the indicia on said cell for indicating the actual prescriptive value required by the eye under test when the said lenses are positioned at said computed test distance before the eye.

12. In an eye testing instrument the combination of a support having a sight opening and a window opening therein, a plurality of lens cells pivotally supported on said support, each of said cells having a series of lenses therein computed for use at a given test distance before the eye of an individual under test and being adapted for selective movement into and out of alignment with the sight opening, one of said cells having indicia on one side thereof for indicating, at least in part, the optical value of the lenses in alignment with the eye and a disc of less diameter than the lens cells carried by the other of said cells and overlying the side surface of the cell having the indicia thereon and having a cut away portion through which said indicia may be viewed, said disc having indicia thereon adjacent the cut away portion adapted to function cooperatively with the indicia on said cell for indicating the actual prescriptive value required by the eye under test when the said lenses are positioned at said computed test distance before the eye, and means for locating said lenses at said test distance.

WILLIAM F. PECK.
ALBIN A. GRADISAR.